US012746781B2

(12) United States Patent
Kuriyama

(10) Patent No.: US 12,746,781 B2
(45) Date of Patent: Sep. 29, 2026

(54) PNEUMATIC TIRE

(71) Applicant: The Yokohama Rubber Co., LTD., Tokyo (JP)

(72) Inventor: Masatoshi Kuriyama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 331 days.

(21) Appl. No.: 17/594,206

(22) PCT Filed: Mar. 27, 2020

(86) PCT No.: PCT/JP2020/014386
§ 371 (c)(1),
(2) Date: Oct. 6, 2021

(87) PCT Pub. No.: WO2020/209114
PCT Pub. Date: Oct. 15, 2020

(65) Prior Publication Data

US 2022/0153066 A1 May 19, 2022

(30) Foreign Application Priority Data

Apr. 8, 2019 (JP) ................................ 2019-073683

(51) Int. Cl.
*B60C 11/12* (2006.01)
*B60C 11/03* (2006.01)

(52) U.S. Cl.
CPC ...... *B60C 11/1272* (2013.01); *B60C 11/0306* (2013.01); *B60C 11/1236* (2013.01); *B60C 11/1259* (2013.01); *B60C 11/1281* (2013.01); *B60C 2011/0367* (2013.01)

(58) Field of Classification Search
CPC ............. B60C 11/1281; B60C 11/1236; B60C 11/1384; B60C 11/1392
See application file for complete search history.

(56) References Cited

U.S. PATENT DOCUMENTS 11,433,713 B2 9/2022 Kouda et al.
2012/0273104 A1* 11/2012 Ishida .................... B60C 11/12 152/209.18
2017/0253086 A1* 9/2017 Sanae ................. B60C 11/0304
2017/0297378 A1* 10/2017 Honda ................ B60C 11/0083
2019/0160879 A1* 5/2019 Arai .................... B60C 11/1263
2019/0193474 A1* 6/2019 Uemura .............. B60C 11/0306
2019/0389255 A1 12/2019 Kubota et al.

FOREIGN PATENT DOCUMENTS

CN 103241070 A 8/2013
JP H05178030 A * 7/1993 ......... B60C 11/1281
JP 6-239111 A 8/1994

(Continued)

*Primary Examiner* — Katelyn W Smith
*Assistant Examiner* — Thomas Frank Schneider
(74) *Attorney, Agent, or Firm* — Thorpe North & Western

(57) ABSTRACT

A pneumatic tire includes a circumferential main groove extending in a tire circumferential direction, a block, which is a land portion defined by the circumferential main groove, a sipe extending through the block in a tire width direction, and chamfered portions provided in the sipe. A total length of lengths of the chamfered portions in the tire width direction is less than 70% of a length of the sipe in the tire width direction.

19 Claims, 21 Drawing Sheets

(56) References Cited

FOREIGN PATENT DOCUMENTS

| | | | | | |
|---|---|---|---|---|---|
| JP | H11189013 | A | * | 7/1999 | .............. B60C 11/11 |
| JP | 11-321237 | A | | 11/1999 | |
| JP | 2003170709 | A | * | 6/2003 | ......... B60C 11/1384 |
| JP | 2013-133081 | A | | 7/2013 | |
| JP | 2013-249018 | A | | 12/2013 | |
| JP | 2014-237398 | A | | 12/2014 | |
| JP | 2015-231812 | A | | 12/2015 | |
| JP | 2017-222208 | A | | 12/2017 | |
| JP | 2017-226366 | A | | 12/2017 | |
| JP | 2018-43637 | A | | 3/2018 | |
| JP | 2018-47798 | A | | 3/2018 | |
| JP | 2018-131003 | A | | 8/2018 | |
| JP | 2019-94009 | A | | 6/2019 | |
| JP | 2019-209873 | A | | 12/2019 | |
| JP | 2019-209874 | A | | 12/2019 | |
| WO | WO-2018043580 | A1 | * | 3/2018 | ............. B60C 11/03 |
| WO | WO 2018/150746 | A1 | | 8/2018 | |

* cited by examiner

PNEUMATIC TIRE

TECHNICAL FIELD

The present technology relates to a pneumatic tire.

BACKGROUND ART

In recent pneumatic tires, sipes may be provided in a tread portion in order to ensure water drainage properties. Additionally, notched sipes provided with a notch portion in a wall surface of the sipe may be provided in the tread portion. A known example of a conventional pneumatic tire that is configured in this manner is the technology described in Japan Unexamined Patent Publication No. 2014-237398.

However, with the known pneumatic tire described above, there is room for improvement in wear resistance performance, dry braking performance, and wet braking performance.

SUMMARY

The technology provides a pneumatic tire with improved wear resistance performance, dry braking performance, and wet braking performance.

A pneumatic tire from an aspect of the present technology includes: a circumferential main groove extending in a tire circumferential direction; a land portion defined by the circumferential main groove; a lug groove provided in the land portion, the lug groove extending in a tire width direction; a sipe provided in the land portion, the sipe extending in the tire width direction; and a chamfered portion provided in the sipe. The lug groove, the sipe, and the chamfered portion are disposed in a row, and a length of the chamfered portion in the tire width direction is less than 70% of a length of the sipe in the tire width direction.

Preferably, the length of the chamfered portion 8 in the tire width direction is 20% or more of the length of the sipe in the tire width direction.

Preferably, a length of the lug groove in the tire width direction is 10% or more and 30% or less of an entire length Ws of the sipe.

Preferably, when a groove depth of the circumferential main groove is D, a depth of the lug groove is Dr, a depth of the sipe is Ds, and a depth of the chamfered portion is Dm, a relationship between depths is $D>Dr\geq Ds>Dm$.

Preferably, when a width of the chamfered portion in a direction orthogonal to an extension direction of the sipe in a road contact surface of the land portion is ML, a relationship between ML and the depth Dm of the chamfered portion is $ML>Dm$.

The chamfered portion may be provided on at least one of groove wall surfaces of the sipe.

The chamfered portion may be provided at a portion of an entire length of the sipe, and the sipe may have a portion not provided with the chamfered portion.

The portion where the chamfered portion is provided may be adjacent to the lug groove.

The lug groove may be provided at an edge portion of the land portion in the tire width direction, and the lug groove may open to the circumferential main groove.

The lug groove may be provided at a portion other than an edge portion of the land portion in the tire width direction, and the lug groove may terminate in the land portion.

One end of the sipe may be connected to the lug groove, and an other end of the sipe may be connected to the circumferential main groove.

One end of the sipe may be connected to the lug groove, and an other end of the sipe may terminate in the land portion.

The pneumatic tire may include two of the lug grooves, and one end of the sipe may be connected to one of the two lug grooves and an other end of the sipe may be connected to the other of the two lug grooves.

The pneumatic tire according to the present technology can improve wear resistance performance, dry braking performance, and wet braking performance.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are substantially identical or that can be substituted and easily conceived by one skilled in the art. Furthermore, the plurality of modified examples described in the embodiments can be combined as desired within the scope apparent to one skilled in the art.

Pneumatic Tire

Figure 1:
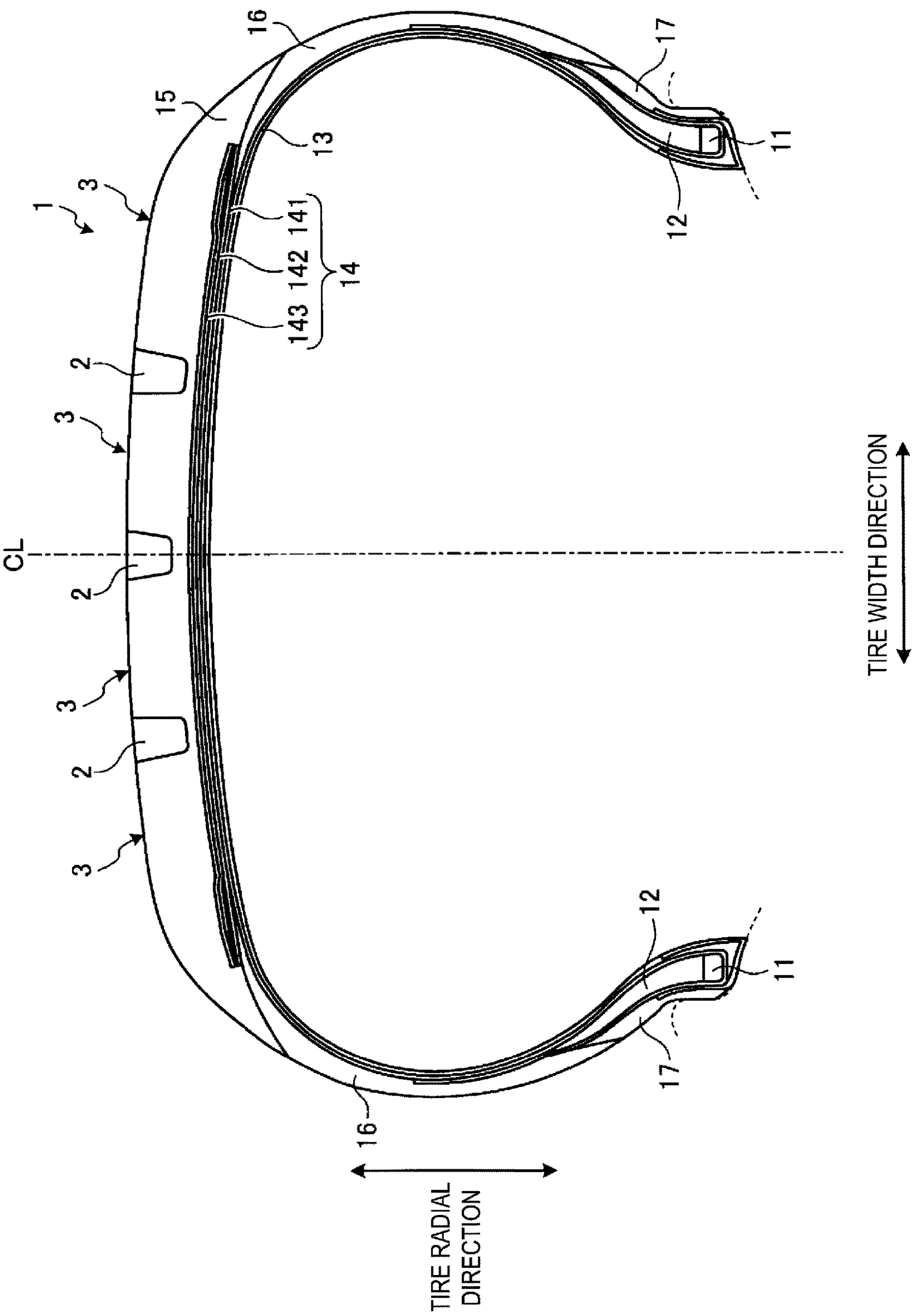
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. FIG. 1 is a cross-sectional view of a half region in a tire radial direction. FIG. 1 illustrates a studless tire for a passenger vehicle as an example of the pneumatic tire.

In FIG. 1, "cross section in a tire meridian direction" refers to a cross section of the tire taken along a plane that includes a tire rotation axis (not illustrated). A reference sign CL denotes a tire equatorial plane and refers to a plane perpendicular to the tire rotation axis that passes through the center point of the tire in a tire rotation axis direction. "Tire width direction" refers to the direction parallel with the tire rotation axis. "Tire radial direction" refers to the direction perpendicular to the tire rotation axis.

A pneumatic tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 have an annular structure formed by winding one or a plurality of bead wires made of steel multiple times and are embedded in bead portions to constitute cores of the left and right bead portions. The pair of bead fillers 12, 12 are disposed on an outer circumference of the pair of bead cores 11, 11 in the tire radial direction and constitute the bead portions.

The carcass layer 13 has a single layer structure made of one carcass ply or a multilayer structure made of a plurality of carcass plies, and extends between the left and right bead cores 11, 11 in a toroidal shape, forming the backbone of the tire. Additionally, both end portions of the carcass layer 13 are wound and turned back toward an outer side in the tire width direction so as to wrap the bead cores 11 and the bead fillers 12 and fixed. The carcass ply (plies) of the carcass layer 13 is made by performing a rolling process on a plurality of coating rubber-covered carcass cords made of steel or an organic fiber material (e.g. aramid, nylon, polyester, rayon, or the like). The carcass ply (plies) has a carcass angle (defined as the inclination angle in the longitudinal direction of the carcass cords with respect to the tire circumferential direction), as an absolute value, of 80 degrees or more and 95 degrees or less.

The belt layer 14 is a multilayer structure including a pair of cross belts 141, 142 and a belt cover 143 and is disposed to wind around the outer circumference of the carcass layer 13. The pair of cross belts 141, 142 is made by performing a rolling process on coating rubber-covered belt cords made of steel or an organic fiber material. The cross belts 141, 142 have a belt angle, as an absolute value, of 20 degrees or more and 55 degrees or less. Furthermore, the pair of cross belts 141, 142 have belt angles (defined as the inclination angle in the longitudinal direction of the belt cords with respect to the tire circumferential direction) of mutually opposite signs and are layered so that the longitudinal directions of the belt cords intersect each other (a so-called crossply structure). Additionally, the belt cover 143 is made by covering belt cords made of steel or an organic fiber material with a coating rubber. The belt cover 143 has a belt angle, as an absolute value, of 0 degrees or more and 10 degrees or less. Further, the belt cover 143 is, for example, a strip material formed by covering one or more belt cords with a coating rubber and winding the strip material spirally around the outer circumferential surface of the cross belts 141, 142 multiple times in the tire circumferential direction.

The tread rubber 15 is disposed on the outer circumference of the carcass layer 13 and the belt layer 14 in the tire radial direction and constitutes a tread portion of the tire. The pair of sidewall rubbers 16, 16 are disposed on the outer side in the tire width direction of the carcass layer 13 and constitute left and right sidewall portions. The pair of rim cushion rubbers 17, 17 are disposed on an inner side in the tire radial direction of the turned back portions of the carcass layer 13 and the left and right bead cores 11, 11 to form a rim-fitting surface of the bead portion.

Tread Pattern

Figure 2:
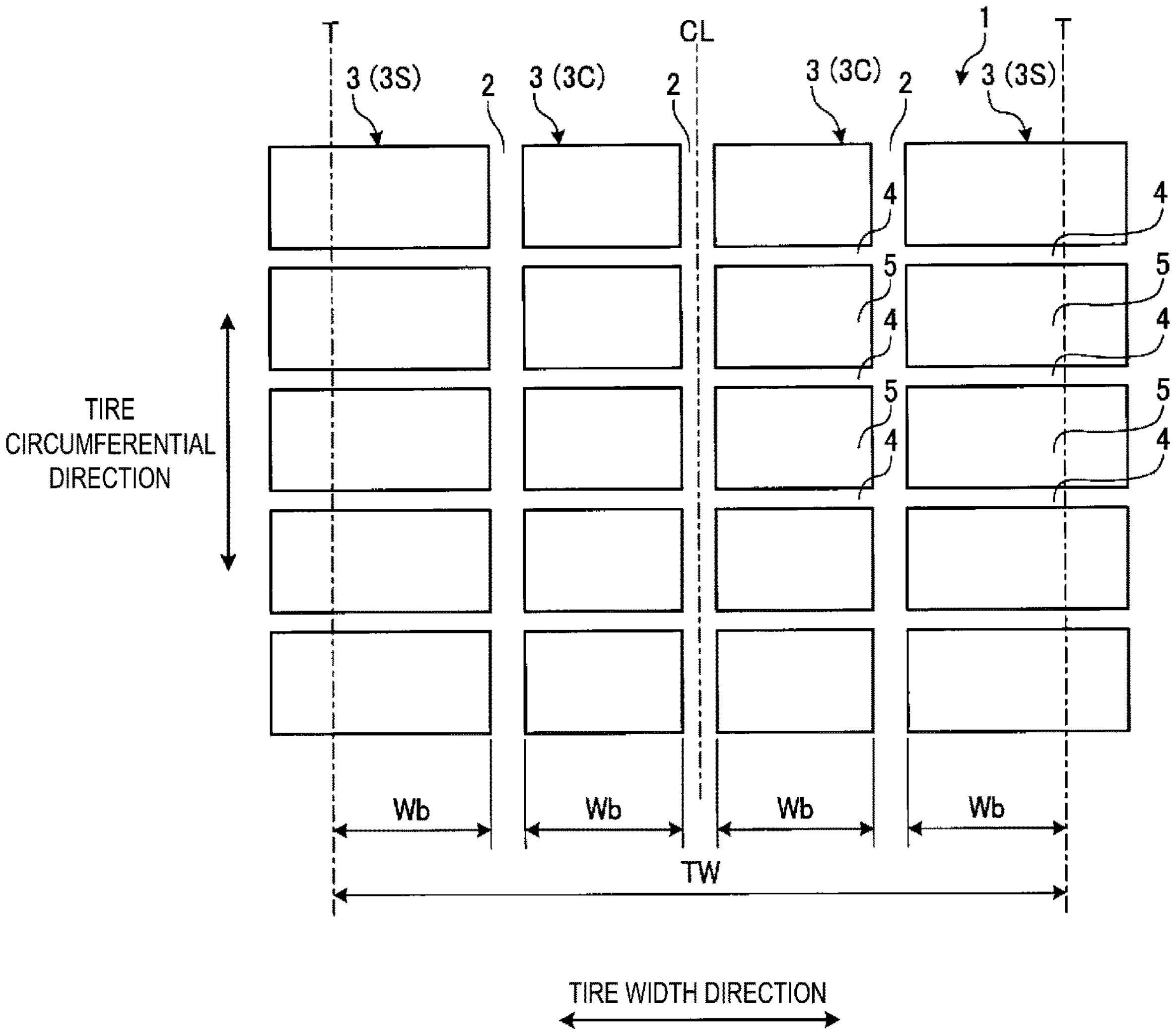
FIG. 2 is a plan view illustrating a tread surface of the pneumatic tire illustrated in FIG. 1.

FIG. 2 is a plan view illustrating a tread surface of the pneumatic tire illustrated in FIG. 1. FIG. 2 illustrates a typical block pattern. In FIG. 2, "tire circumferential direction" refers to the direction revolving about the tire rotation axis. Reference sign T denotes a tire ground contact edge, and a dimension symbol TW denotes a tire ground contact width.

As illustrated in FIG. 2, the pneumatic tire 1 is provided with, in the tread surface, a plurality of circumferential main grooves 2 extending in the tire circumferential direction, a plurality of land portions 3 defined by the circumferential main grooves 2, and a plurality of through lug grooves 4 disposed in the land portions 3. Of the plurality of land portions 3, the land portions 3 near the tire equatorial plane CL are center land portions 3C. The land portions 3 on the outer side in the tire width direction of the center land portions 3C are shoulder land portions 3S.

"Main groove" refers to a groove on which a wear indicator must be provided as specified by JATMA and has a groove width of 3.0 mm or more and a groove depth of 5.0 mm or more. "Lug groove" refers to a lateral groove extending in a tire width direction, has a groove width of 1.0 mm or more and a groove depth of 3.0 mm or more, and opens when the tire comes into contact with the ground to function as a groove.

The groove width is the maximum distance between left and right groove walls at the groove opening portion and is measured when the tire is mounted on a specified rim, inflated to the specified internal pressure, and in an unloaded state. In a configuration in which the land portion includes a notch portion or a chamfered portion on an edge portion thereof, the groove width is measured with intersection points between the tread contact surface and extension lines of the groove walls as measurement points, in a cross-sectional view with the groove length direction as a normal line direction. In a configuration in which the grooves extend in a zigzag shape or a wave shape in the tire circumferential direction, the groove width is measured with reference to the center line of the oscillation of the groove walls as measurement points.

The groove depth is the maximum distance from the tread contact surface to the groove bottom and is measured when the tire is mounted on a specified rim, inflated to the specified internal pressure, and in an unloaded state. Additionally, in a configuration in which the grooves include a partially uneven portion or sipe on the groove bottom, the groove depth is measured excluding these portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in “TIRE LOAD LIMITS AT VARIOUS COLD INFLATION PRESSURES” defined by TRA, or to “INFLATION PRESSURES” defined by ETRTO. Additionally, “specified load” refers to a “maximum load capacity” defined by JATMA, the maximum value in “TIRE LOAD LIMITS AT VARIOUS COLD INFLATION PRESSURES” defined by TRA, or “LOAD CAPACITY” defined by ETRTO. However, in the case of JATMA, for a tire for a passenger vehicle, the specified internal pressure is an air pressure of 180 kPa, and the specified load is 88% of the maximum load capacity.

Among the two or more circumferential main grooves (including the circumferential main grooves disposed on the tire equatorial plane CL) disposed in one region demarcated by the tire equatorial plane CL, a circumferential main groove located on the outermost side in the tire width direction is defined as an outermost circumferential main groove. The outermost circumferential main groove is defined in each of the left and right regions demarcated by the tire equatorial plane CL. The distance from the tire equatorial plane CL to the outermost circumferential main grooves (dimension symbol omitted in the drawing) is in a range of 20% or more and 35% or less of the tire ground contact width TW.

The tire ground contact width TW is measured as the maximum linear distance in the tire axial direction of a contact surface between the tire and a flat plate when the tire is mounted on a specified rim, inflated to a specified internal pressure, placed perpendicular to the flat plate in a static state, and loaded with a load corresponding to a specified load.

The tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

The land portions 3 located on the outer side in the tire width direction that are defined by the outermost circumferential main grooves 2 are defined as shoulder land portions. The shoulder land portions 3 are land portions located on the outermost side in the tire width direction and on the tire ground contact edge T.

Additionally, in the configuration of FIG. 2, each of the land portions 3 includes a plurality of through lug grooves 4. The through lug grooves 4 have an open structure that extends through the land portions 3 and are disposed at predetermined intervals in the tire circumferential direction. As a result, all of the land portions 3 are divided in the tire circumferential direction by the through lug grooves 4 to form a block row composed of a plurality of blocks 5. However, no such limitation is intended, and for example, the land portions 3 may be ribs that are continuous in the tire circumferential direction (not illustrated).

The ground contact width Wb of each block 5 is measured as the maximum linear distance in the tire axial direction on a contact surface between the block and a flat plate when the tire is mounted on a specified rim, inflated to the specified internal pressure, placed perpendicular to the flat plate in a static state, and loaded with a load corresponding to the specified load.

In the configuration of FIG. 2, the circumferential main grooves 2 and the through lug grooves 4 are disposed in a lattice-like form to form rectangular blocks 5. However, the blocks 5 may have any shape. For example, the circumferential main grooves 2 may have a zigzag shape having amplitudes in the tire width direction, or the through lug grooves 4 may be bent or curved (not illustrated). Additionally, for example, the pneumatic tire 1 may include, instead of the circumferential main grooves 2 and the through lug grooves 4 in FIG. 2, a plurality of inclined main grooves that extend while inclining at a predetermined angle with respect to the tire circumferential direction, lug grooves that communicate adjacent inclined main grooves with each other, and a plurality of blocks defined by the inclined main grooves and the lug grooves (not illustrated). In these configurations, the blocks can have elongated and complex shapes.

Also, although not illustrated in FIG. 2, each block 5 includes a lug groove, a sipe, and a chamfered portion formed in the sipe, as described below.

Sipe, Chamfered Portion, and Lug Groove of Block

Figure 3:
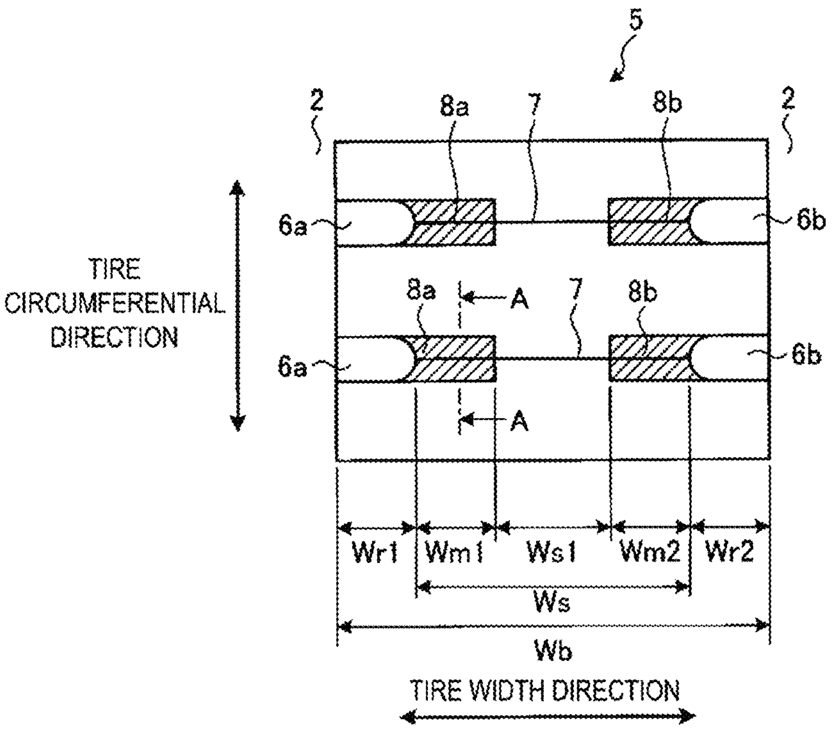
FIG. 3 is an enlarged view illustrating a first example of a block illustrated in FIG. 2.

FIG. 3 is an enlarged view illustrating a first example of the block illustrated in FIG. 2. FIG. 3 is a plan view of one block 5 located in the center land portion 3C.

As illustrated in FIG. 3, the block 5 includes a plurality of non-through lug grooves 6*a* and 6*b*, a plurality of sipes 7, and chamfered portions 8*a* and 8*b* provided in each of the sipes 7. The non-through lug grooves 6*a* and 6*b*, the sipe 7, and the chamfered portions 8*a* and 8*b* are disposed in a row. The sipe 7 is a notch formed in the tread contact surface, and has a groove width of 0.4 mm or more and 1.0 mm or less and a groove depth of 4 mm or more and 32 mm or less. The sipe 7 is closed in a case where the tire contacts the ground. The non-through lug grooves 6*a* and 6*b* are lateral grooves extending in a tire width direction, have a groove width of 1.0 mm or more and a groove depth of 3.0 mm or more, and open when the tire comes into contact with the ground to function as grooves.

The sipe 7 extends in the tire width direction in the block 5, that is, in the land portion (see FIG. 2). In the portion where the sipe 7 is disposed, the sipe 7 has a length less than 100% with respect to the length in the tire width direction. When the block 5 is rectangular, the sipe 7 has a length of 100% with respect to the minimum length of the block 5 in the tire width direction. When the block 5 is rectangular, the sipe 7 has a length of 100% with respect to a length obtained by subtracting the length of the non-through lug grooves 6*a* and 6*b* from the maximum length of the block 5 in the tire width direction. The sipe 7 divides the blocks 5 in the portion where the sipe 7 is provided.

FIG. 3 illustrates a case where two sipes 7 are provided in the block 5 that is defined by a pair of circumferential main grooves 2 and the lug grooves. The number of sipes 7 is not limited to two, and more sipes 7 may be provided.

In FIG. 3, two chamfered portions 8*a* and 8*b* are provided in the sipe 7 in the present example. The chamfered portions 8*a* and 8*b* are portions that connect edge portions of adjacent surfaces to each other with flat surfaces (for example, C-chamfer) or curved surfaces (for example, R-chamfer). In other words, with the groove wall surface of the sipe 7 and the ground contact surface of the block 5 being adjacent, portions where the edge portions of the adjacent surfaces are connected with flat surfaces or curved surfaces are the chamfered portions 8*a* and 8*b*.

The non-through lug groove 6*a* and the non-through lug groove 6*b* are provided at ends (i.e., edge portions) of the block 5 in the tire width direction. One end of the sipe 7 in the tire width direction is connected to the non-through lug groove 6*a*, and the other end is connected to the non-through lug groove 6*b*. One end of the non-through lug groove 6*a* in the tire width direction is connected to the sipe 7, and the other end is open to the circumferential main groove 2. One end of the non-through lug groove 6*b* in the tire width direction is connected to the sipe 7, and the other end is open to the circumferential main groove 2.

In FIG. 3, one sipe 7 is provided with the two chamfered portions 8*a*, 8*b*. The chamfered portions 8*a*, 8*b* are provided at a portion of the entire length of the sipe 7. The chamfered portion 8*a*, which is a portion of the entire length of the sipe 7, is adjacent to the non-through lug groove 6*a*. The chamfered portion 8*b*, which is a portion of the entire length of the sipe 7, is adjacent to the non-through lug groove 6*b*. A length of the chamfered portion 8*a* in the tire width direction is Wm1 and a length of the chamfered portion 8*b* in the tire width direction is Wm2. The sipe 7 has a portion where no chamfered portion is provided. A length of the portion of the sipe 7 where no chamfered portion is provided in the tire width direction is Ws1.

An entire length Ws of the sipe 7 is the total of the length Wm1, the length Wm2, and the length Ws1. A total length Wm of the length Wm1 of the chamfered portion 8*a* and the length Wm2 of the chamfered portion 8*b* is less than 70% of the entire length Ws of the sipe 7. When the length Wm is less than 70% of the length Ws, block rigidity can be maintained to improve wear resistance performance as well as dry braking performance and wet braking performance. Note that, a portion of the entire length Ws of the sipe 7 excluding the length Wm1 and the length Wm2 of the chamfered portions 8*a*, 8*b* in the tire width direction is a portion where only the sipe is provided.

The total length Wm of the length Wm1 of the chamfered portion 8*a* and the length Wm2 of the chamfered portion 8*b* is 20% or more of the entire length of the sipe 7. When the entire length Wm of the chamfered portion 8*a* and the chamfered portion 8*b* is 20% or more of the entire length Ws of the sipe 7, the block rigidity can be maintained to improve wear resistance performance as well as dry braking performance and wet braking performance.

Here, it is given that a length of the non-through lug groove 6*a* in the tire width direction is Wr1, and a length of the non-through lug groove 6*b* in the tire width direction is Wr2. A total length Wr of the length Wr1 and the length Wr2 is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a* and the length Wm2 of the chamfered portion 8*b* each are 3 mm or more and 36 mm or less, and the length Wr1 of the non-through lug groove 6*a* and the length Wr2 of the non-through lug groove 6*b* each are 1 mm or more and 20 mm or less.

Note that the width of the circumferential main groove 2 in the direction perpendicular to its extension direction is, for example, 5 mm or more and 12 mm or less. The width of the chamfered portion 8 in the direction perpendicular to its extension direction is, for example, 1.0 mm or more and 3.0 mm or less. The width of the non-through lug grooves 6*a*, 6*b* in the direction perpendicular to its extension direction is, for example, 2.0 mm or more and 4.0 mm or less.

Figure 4:
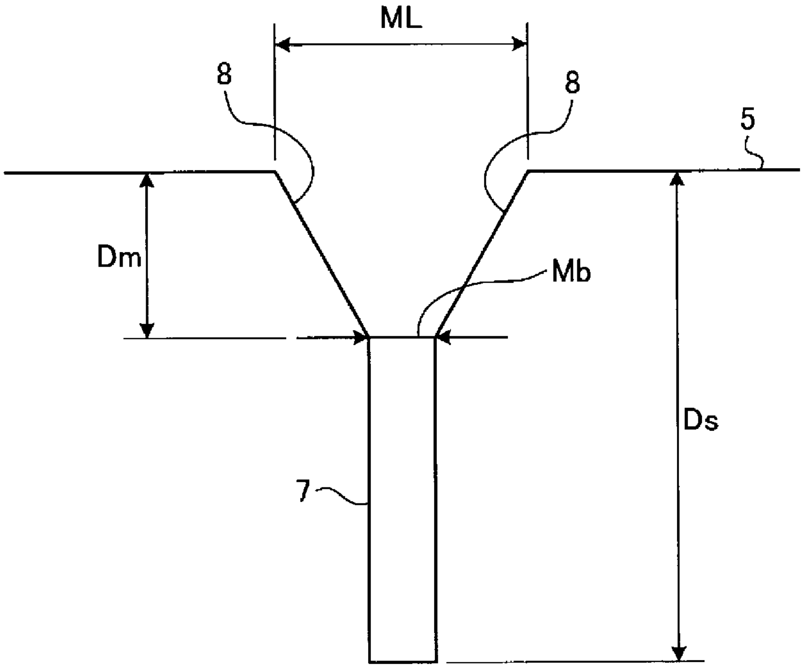
FIG. 4 is a cross-sectional view along line A-A in FIG. 3.

FIG. 4 is a cross-sectional view along line A-A in FIG. 3. In FIG. 4, it is given that a depth of the sipe 7 is Ds, a depth (depth of the deepest portion) of the chamfered portions 8 (chamfered portions 8*a*, 8*b*) is Dm, and a groove depth of the circumferential main groove is D. Further, the depth of the lug grooves is defined as Dr. In this case, the relationship between the depths is D>Dr≥Ds>Dm. With such a relationship in depth, block rigidity can be maintained to improve wear resistance performance as well as dry braking performance and wet braking performance. Note that, similarly, the relationship between the depths in each of following examples is D>Dr≥Ds>Dm.

The depth of the circumferential main groove 2 is, for example, 4 mm or more and 8 mm or less. The depth of the sipe 7 is, for example, 3 mm or more and 6 mm or less. The depth (depth of the deepest portion) of the chamfered portion 8 is, for example, 1 mm or more and 2 mm or less. The depth of the lug groove is, for example, 3 mm or more and 6 mm or less.

When a width of the chamfered portion 8 in the direction orthogonal to the extension direction of the sipe 7 on the road contact surface of the block 5 of the land portion 3 is ML, the relationship between the width ML and the depth Dm of the chamfered portion 8 is ML>Dm. In other words, the width ML of the chamfered portion 8 becomes narrower toward a deepest portion Md. With such a relationship in depth, block rigidity can be maintained to improve dry braking performance and wet braking performance. Note that, similarly, the relationship between the depths in each of following examples is ML>Dm.

OTHER EMBODIMENTS

Figure 5:
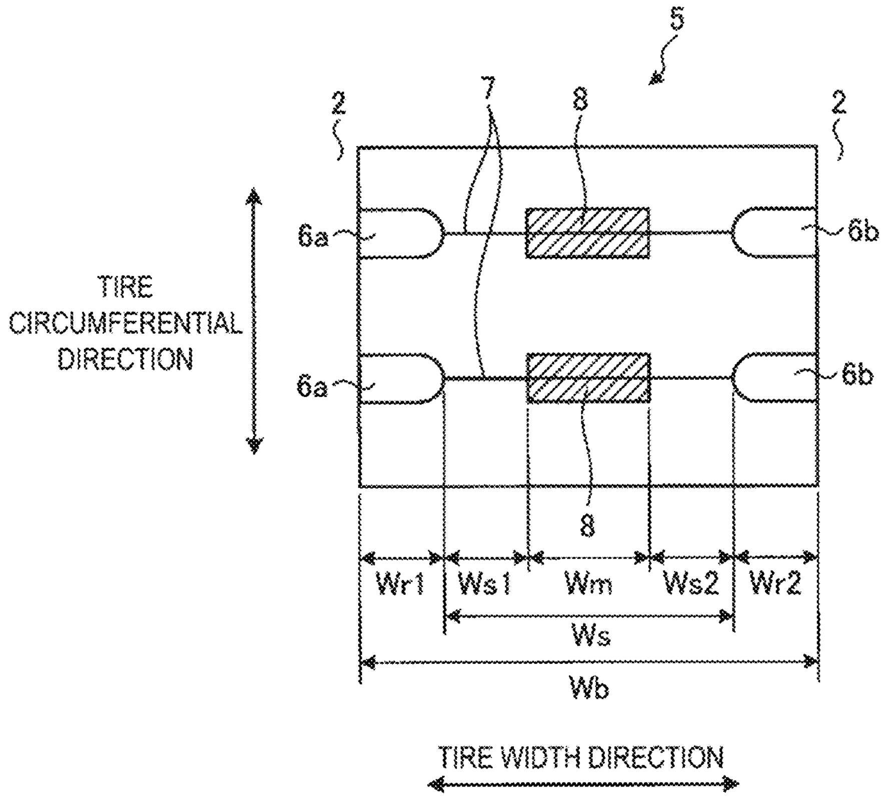
FIG. 5 is an enlarged view illustrating a second example of the block illustrated in FIG. 2.

For the blocks illustrated in FIG. 2, various arrangement examples for the sipes, the chamfered portions, and the lug grooves are conceivable. FIG. 5 is an enlarged view illustrating a second example of the block illustrated in FIG. 2. FIG. 5 is a plan view of one block 5 located in the center land portion 3C. In the present example, one sipe 7 is provided with one chamfered portion 8, and two non-through lug grooves 6*a* and 6*b* are provided in the block 5. The sipe 7, the chamfered portion 8, the non-through lug groove 6*a*, and the non-through lug groove 6*b* are disposed in a row. One end of the chamfered portion 8 is connected to the non-through lug groove 6*a*, and the other end is connected to the non-through lug groove 6*b*. The non-through lug groove 6*a* and the non-through lug groove 6*b* are provided at ends (i.e., edge portions) of the block 5 in the tire width direction. The non-through lug groove 6*a* and the non-through lug groove 6*b* are connected to different circumferential main grooves 2. The portions having the length Ws1 and the length Ws2 in the tire width direction in the entire length of the sipe 7 are provided with no chamfered portion 8. Here, the entire length of the sipe 7 is defined as Ws. The entire length Ws of the sipe 7 is the total length of the length Ws1, the length Ws2, and the length Wm of the chamfered portion 8 in the tire width direction.

The length Wm of the chamfered portion 8 in the tire width direction is less than 70% of the entire length Ws of the sipe 7. When the length Wm is less than 70% of the length Ws, block rigidity can be maintained to improve wear resistance performance as well as dry braking performance and wet braking performance. Note that, a portion of the entire length Ws of the sipe 7 excluding the length Wm of the chamfered portion 8 in the tire width direction is a portion where only the sipe 7 is provided.

Here, it is given that a length of the non-through lug groove 6*a* in the tire width direction is Wr1, and a length of the non-through lug groove 6*b* in the tire width direction is Wr2. A total length Wr of the length Wr1 and the length Wr2 is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm of the chamfered portion 8 is 3 mm or more and 36 mm or less, and the length Wr1 of the non-through lug groove 6*a* and the length Wr2 of the non-through lug groove 6*b* each are 1 mm or more and 20 mm or less.

The length Wm is 20% or more of the entire length Ws of the sipe 7. When the length Wm is 20% or more of the entire length Ws of the sipe 7, block rigidity can be maintained to improve wear resistance performance as well as dry braking performance and wet braking performance.

It is given that a depth of the sipe 7 is Ds, a depth (depth of the deepest portion) of the chamfered portion 8 is Dm, and a groove depth of the circumferential main groove is D. Further, the depth of the lug grooves is defined as Dr. In this case, the relationship between the depths is $D>Dr\geq Ds>Dm$. With such a relationship in depth, block rigidity can be maintained to improve wear resistance performance as well as dry braking performance and wet braking performance.

Figure 6:
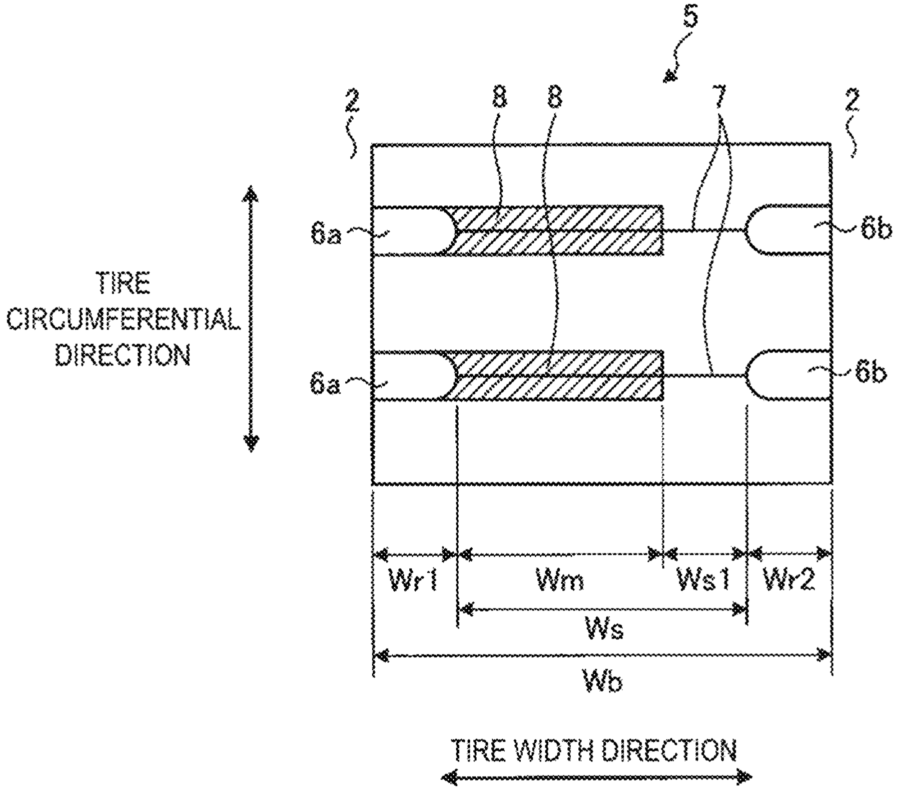
FIG. 6 is an enlarged view illustrating a third example of the block illustrated in FIG. 2.

FIG. 6 is an enlarged view illustrating a third example of the block illustrated in FIG. 2. FIG. 6 is a plan view of one block 5 located in the center land portion 3C. In the present example, one sipe 7 is provided with one chamfered portion 8, and two non-through lug grooves 6*a* and 6*b* are provided in the block 5. The sipe 7, the chamfered portion 8, the non-through lug groove 6*a*, and non-through the lug groove 6*b* are disposed in a row. One end of the chamfered portion 8 is connected to the non-through lug groove 6*a*, and the other end is not connected to the non-through lug groove 6*b*. The non-through lug groove 6*a* and the non-through lug groove 6*b* are provided at ends (i.e., edge portions) of the block 5 in the tire width direction. The non-through lug groove 6*a* and the non-through lug groove 6*b* are connected to different circumferential main grooves 2. The portion having the length Ws1 in the tire width direction in the entire length Ws of the sipe 7 is provided with no chamfered portion 8. The entire length Ws of the sipe 7 is the total length of the length Ws1 and the length Wm of the chamfered portion 8 in the tire width direction.

The length Wm of the chamfered portion 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 excluding the length Wm of the chamfered portion 8 in the tire width direction is a portion where only the sipe 7 is provided.

Here, it is given that a length of the non-through lug groove 6*a* in the tire width direction is Wr1, and a length of the non-through lug groove 6*b* in the tire width direction is Wr2. A total length Wr of the length Wr1 and the length Wr2 is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm of the chamfered portion 8 is 3 mm or more and 36 mm or less, and the length Wr1 of the non-through lug groove 6*a* and the length Wr2 of the non-through lug groove 6*b* each are 1 mm or more and 20 mm or less.

The length Wm of the chamfered portion 8 in the tire width direction is 20% or more of the entire length Ws of the sipe 7 in the tire width direction. When the length Wm is 20% or more of the entire length Ws, block rigidity can be maintained to improve wear resistance performance as well as dry braking performance and wet braking performance.

Figure 7:
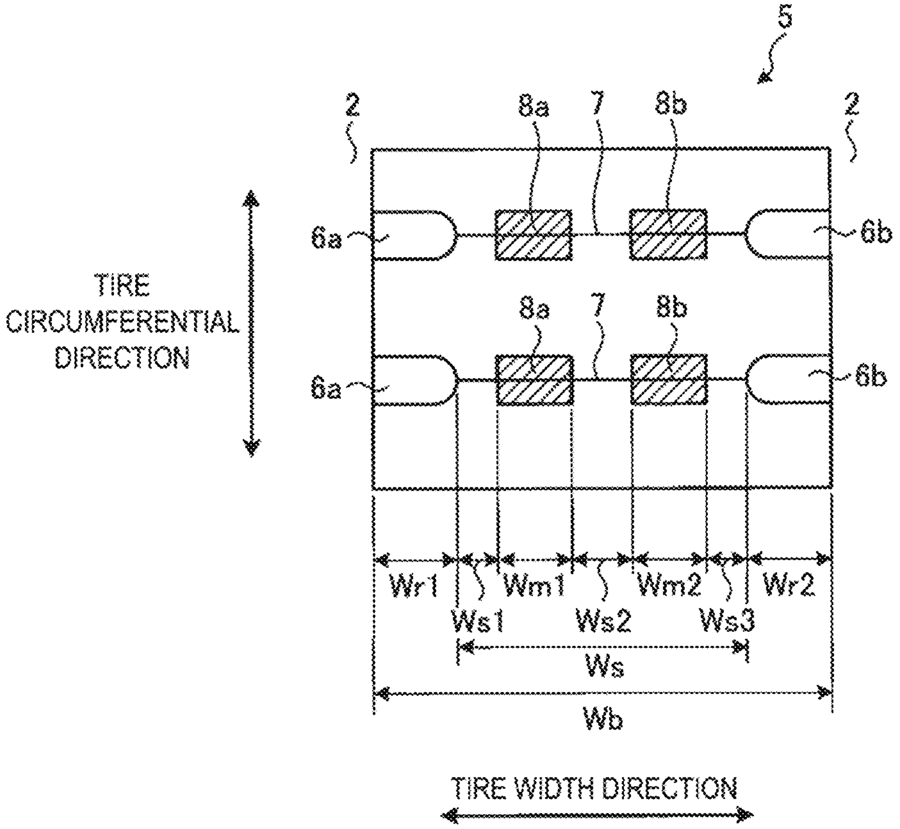
FIG. 7 is an enlarged view illustrating a fourth example of the block illustrated in FIG. 2.

FIG. 7 is an enlarged view illustrating a fourth example of the block illustrated in FIG. 2. FIG. 7 is a plan view of one block 5 located in the center land portion 3C. In the present example, one sipe 7 is provided with two chamfered portions 8*a*, 8*b*, and two non-through lug grooves 6*a* and 6*b* are provided in the block 5. The sipe 7, the chamfered portion 8*a*, the chamfered portion 8*b*, the non-through lug groove 6*a*, and the non-through lug groove 6*b* are disposed in a row. The chamfered portions 8*a*, 8*b* are not connected to the respective non-through lug groove 6*a* and the non-through lug groove 6*b*. The non-through lug groove 6*a* and the non-through lug groove 6*b* are provided at ends (i.e., edge portions) of the block 5 in the tire width direction. The non-through lug groove 6*a* and the non-through lug groove 6*b* are connected to different circumferential main grooves 2. Portions having the length Ws1, the length Ws2, and the length Ws3 in the tire width direction in the entire length Ws of the sipe 7 are provided with no chamfered portions 8*a*, 8*b*. The entire length Ws of the sipe 7 is the total length of the length Ws1, the length Ws2, the length Ws3, and the length Wm1 and the length Wm2 of the chamfered portions 8*a*, 8*b* in the tire width direction.

A total length of the length Wm1 of the chamfered portion 8*a* in the tire width direction and the length Wm2 of the chamfered portion 8*b* in the tire width direction is defined as Wm. The length Wm is less than 70% of the entire length Ws of the sipe 7. When the total length Wm of the length Wm1 and the length Wm2 is less than 70% of the length Ws, block rigidity can be maintained to improve wear resistance performance as well as dry braking performance and wet braking performance. Note that, a portion of the entire length Ws of the sipe 7 excluding the lengths Wm1 and Wm2 of the chamfered portions 8*a*, 8*b* in the tire width direction is a portion where only the sipe 7 is provided.

Here, it is given that a length of the non-through lug groove 6*a* in the tire width direction is Wr1, and a length of the non-through lug groove 6*b* in the tire width direction is Wr2. A total length Wr of the length Wr1 and the length Wr2 is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a* and the length Wm2 of the chamfered portion 8*b* each are 3 mm or more and 36 mm or less, and the length Wr1 of the non-through lug groove 6*a* and the length Wr2 of the non-through lug groove 6*b* each are 1 mm or more and 20 mm or less.

The total length of the length Wm1 and the length Wm2 is 20% or more of the entire length Ws of the sipe 7 in the tire width direction. When the total length Wm of the length Wm1 and the length Wm2 is 20% or more of the length Ws, block rigidity can be maintained to improve wear resistance performance as well as dry braking performance and wet braking performance.

Figure 8:
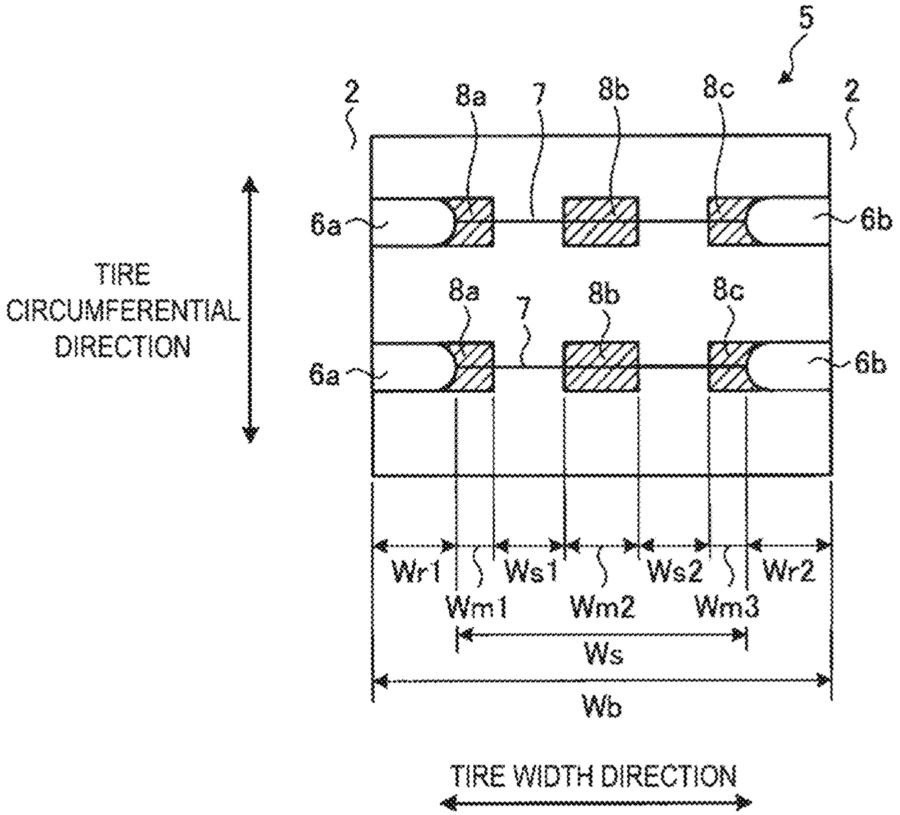
FIG. 8 is an enlarged view illustrating a fifth example of the block illustrated in FIG. 2.

FIG. 8 is an enlarged view illustrating a fifth example of the block illustrated in FIG. 2. FIG. 8 is a plan view of one block 5 located in the center land portion 3C. In the present example, one sipe 7 is provided with three chamfered portions 8*a*, 8*b*, 8*c*, and two non-through lug grooves 6*a* and 6*b* are provided in the block 5. The sipe 7, the chamfered portion 8*a*, the chamfered portion 8*b*, the chamfered portion 8*c*, the non-through lug groove 6*a*, and the non-through lug groove 6*b* are disposed in a row. The chamfered portions 8*a*, 8*c* are connected to different non-through lug grooves 6*a* and 6*b*. The chamfered portion 8*b* is not connected to the non-through lug groove 6*a* and the non-through lug groove 6*b*. The non-through lug groove 6*a* and the non-through lug groove 6*b* are provided at ends (i.e., edge portions) of the block 5 in the tire width direction. The non-through lug groove 6*a* and the non-through lug groove 6*b* are connected to different circumferential main grooves 2. The portions having the length Ws1 and the length Ws2 in the tire width direction in the entire length Ws of the sipe 7 are provided with no chamfered portion. The entire length Ws of the sipe 7 is the total length of the length Ws1, the length Ws2, and the length Wm of the chamfered portions 8 in the tire width direction.

The length Wm of the chamfered portion 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm of the chamfered portions 8 in the tire width direction is a portion where only the sipe 7 is provided.

Here, it is given that a length of the non-through lug groove 6*a* in the tire width direction is Wr1, and a length of the non-through lug groove 6*b* in the tire width direction is Wr2. A total length Wr of the length Wr1 and the length Wr2 is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a*, the length Wm2 of the chamfered portion 8*b*, and the length Wm3 of the chamfered portion 8*c* each are 3 mm or more and 36 mm or less, and the length Wr1 of the non-through lug groove 6*a* and the length Wr2 of the non-through lug groove 6*b* each are 1 mm or more and 20 mm or less.

The total length of the lengths Wm1, Wm2, and Wm3 is 20% or more of the entire length Ws of the sipe 7 in the tire width direction. When the total length Wm of the lengths Wm1, Wm2, and Wm3 is 20% or more of the length Ws, block rigidity can be maintained to improve wear resistance performance as well as dry braking performance and wet braking performance.

Figure 9:
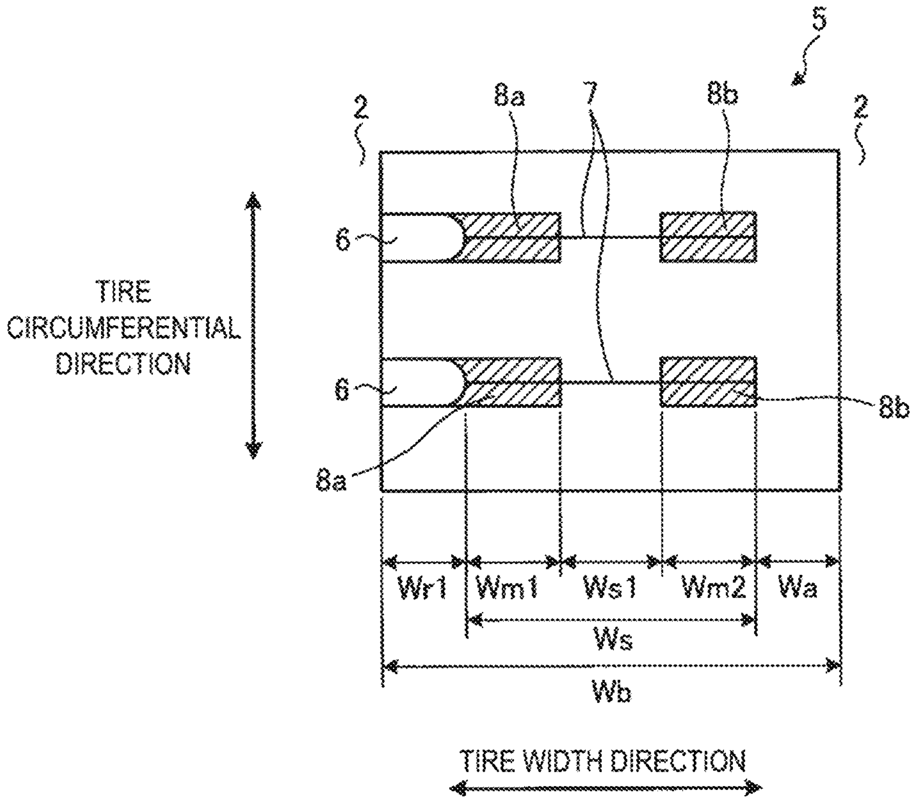
FIG. 9 is an enlarged view illustrating a sixth example of the block illustrated in FIG. 2.

FIG. 9 is an enlarged view illustrating a sixth example of the block illustrated in FIG. 2. FIG. 9 is a plan view of one block 5 located in the center land portion 3C. In FIG. 9, the sipe 7 in the present example is provided with two chamfered portions 8*a*, 8*b*, and one non-through lug groove 6 is provided in the block 5. The sipe 7, the chamfered portions 8*a*, the chamfered portions 8*b*, and the non-through lug groove 6 are disposed in a row. The chamfered portion 8*a* is connected to the non-through lug groove 6. The chamfered portion 8*b* is not connected to the non-through lug groove 6. The non-through lug groove 6 is provided at an end (i.e., edge portion) of the block 5 in the tire width direction. The non-through lug groove 6 is connected to the circumferential main groove 2. One end of the sipe 7 is connected to the non-through lug groove 6. The other end of the sipe 7 is not connected to the circumferential main groove 2 or the lug groove, and terminates in the block 5, that is, in the land portion. The portion having the length Ws1 in the tire width direction in the entire length Ws of the sipe 7 is provided with no chamfered portions 8*a*, 8*b*. The entire length Ws of the sipe 7 is the total length of the length Ws1 and the lengths Wm1, Wm2 of the chamfered portions 8*a*, 8*b* in the tire width direction.

A total length of the length Wm1 of the chamfered portion 8*a* in the tire width direction and the length Wm2 of the chamfered portion 8*b* in the tire width direction is less than 70% of the entire length Ws of the sipe 7. When the total length of the length Wm1 and the length Wm2 is less than 70% of the length Ws, block rigidity can be maintained to improve wear resistance performance as well as dry braking performance and wet braking performance. Note that, a portion of the entire length Ws of the sipe 7 in the tire width direction excluding the lengths Wm1 and Wm2 of the chamfered portions 8*a*, 8*b* in the tire width direction is a portion where only the sipe is provided. No sipe is provided in a portion having a length Wa extending from a termination position of the sipe 7 to the main groove 2 where no non-through lug groove 6 is provided.

Here, it is given that a length of the non-through lug groove 6*a* in the tire width direction is Wr1, and a length of the non-through lug groove 6*b* in the tire width direction is Wr2. A total length Wr of the length Wr1 and the length Wr2 is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a*, the length Wm2 of the chamfered portion 8*b*, and the length Wm3 of the chamfered portion 8*c* each are 3 mm or more and 36 mm or less, and the length Wr1 of the non-through lug groove 6*a* and the length Wr2 of the non-through lug groove 6*b* each are 1 mm or more and 20 mm or less.

The total length of the lengths Wm1 and Wm2 is 20% or more of the entire length Ws of the sipe 7 in the tire width direction. When the total length of the lengths Wm1 and Wm2 is 20% or more of the length Ws, block rigidity can be maintained to improve wear resistance performance as well as dry braking performance and wet braking performance.

Figure 10:
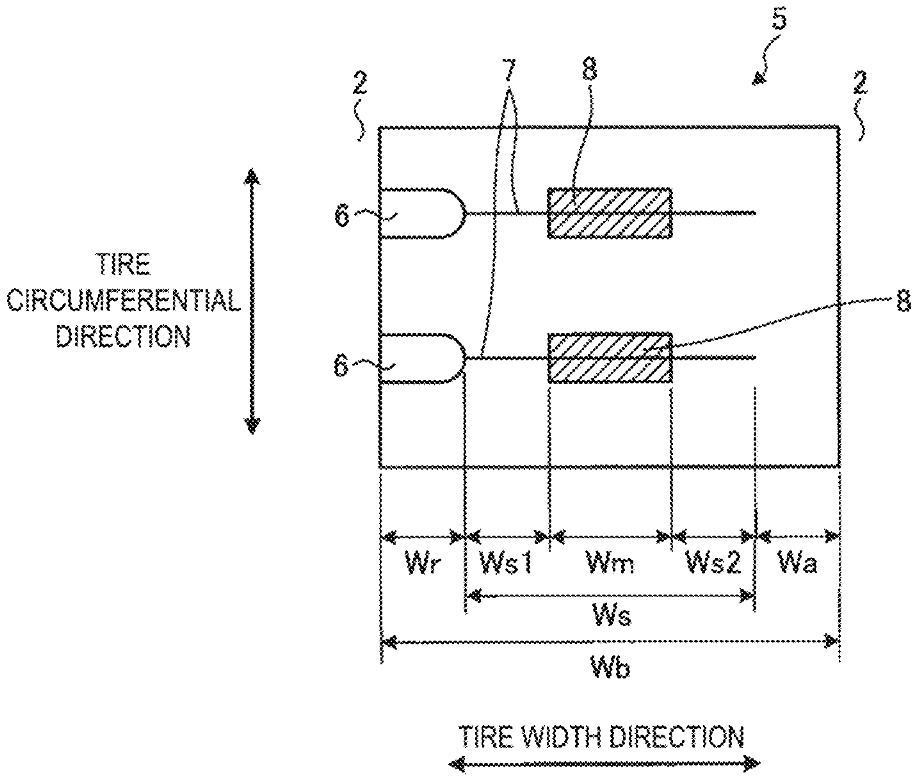
FIG. 10 is an enlarged view illustrating a seventh example of the block illustrated in FIG. 2.

FIG. 10 is an enlarged view illustrating a seventh example of the block illustrated in FIG. 2. FIG. 10 is a plan view of one block 5 located in the center land portion 3C. In FIG. 10, the sipe 7 in the present example is provided with one chamfered portion 8, and one non-through lug groove 6 is provided in the block 5. The sipe 7, the chamfered portions 8, and the non-through lug groove 6 are disposed in a row. The chamfered portion 8 is not connected to the non-through lug groove 6. The non-through lug groove 6 is provided at an end (i.e., edge portion) of the block 5 in the tire width direction. The lug groove 6 is connected to the circumferential main groove 2. One end of the sipe 7 is connected to the non-through lug groove 6. The other end of the sipe 7 is not connected to the circumferential main groove 2 or the lug groove, and terminates in the block 5, that is, in the land portion. The portions having the length Ws1 and the length Ws2 in the tire width direction in the entire length Ws of the sipe 7 are provided with no chamfered portion. The entire length Ws of the sipe 7 is the total length of the length Ws1, the length Ws2, and the length Wm of the chamfered portions 8 in the tire width direction.

The length Wm of the chamfered portion 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm of the chamfered portion 8 in the tire width direction is a portion where only the sipe is provided. No sipe is provided in a portion having a length Wa extending from a termination position of the sipe 7 to the main groove 2 where no non-through lug groove 6 is provided.

Here, a length of the non-through lug grooves 6 in the tire width direction is defined as Wr. The length Wr is preferably 10% or more and 30% or less of the entire length Ws of the sipe 7. When the length Wr of the non-through lug groove 6 is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length of the chamfered portion 8 is 3 mm or more and 36 mm or less, and the length Wr of the non-through lug groove 6 is 1 mm or more and 20 mm or less.

The length Wm is 20% or more of the entire length Ws of the sipe 7 in the tire width direction. When the length Wm is 20% or more of the entire length Ws, block rigidity can be maintained to improve wear resistance performance as well as dry braking performance and wet braking performance.

Figure 11:
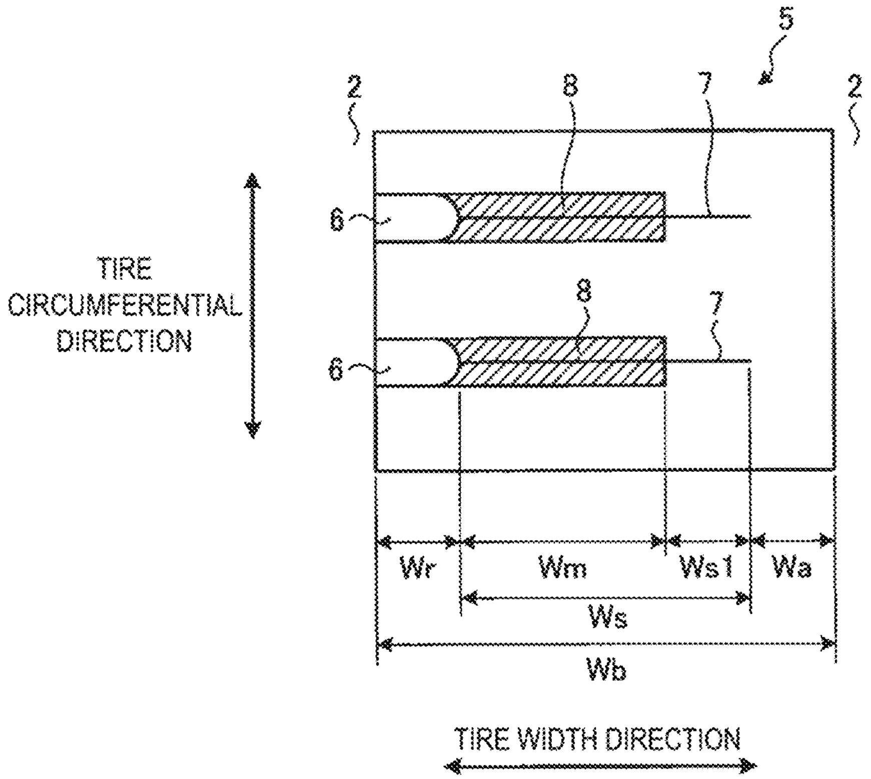
FIG. 11 is an enlarged view illustrating an eighth example of the block illustrated in FIG. 2.

FIG. 11 is an enlarged view illustrating an eighth example of the block illustrated in FIG. 2. FIG. 11 is a plan view of one block 5 located in the center land portion 3C. In FIG. 11, the sipe 7 in the present example is provided with one chamfered portion 8, and one non-through lug groove 6 is provided in the block 5. The sipe 7, the chamfered portions 8, and the non-through lug groove 6 are disposed in a row. The chamfered portion 8 is connected to the non-through lug groove 6. The non-through lug groove 6 is provided at an end (i.e., edge portion) of the block 5 in the tire width direction. The non-through lug groove 6 is connected to the circumferential main groove 2. One end of the sipe 7 is connected to the non-through lug groove 6. The other end of the sipe 7 is not connected to the circumferential main groove 2 or the lug groove, and terminates in the block 5, that is, in the land portion. The portion having the length Ws1 in the tire width direction in the entire length Ws of the sipe 7 is provided with no chamfered portion 8. The entire length Ws of the sipe 7 is the total length of the length Ws1 and the length Wm of the chamfered portion 8 in the tire width direction.

The length Wm of the chamfered portion 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm of the chamfered portion 8 in the tire width direction is a portion where only the sipe is provided. No sipe is provided in a portion having a length Wa extending from a termination position of the sipe 7 to the main groove 2 where no non-through lug groove 6 is provided.

Here, a length of the non-through lug grooves 6 in the tire width direction is defined as Wr. The length Wr is preferably 10% or more and 30% or less of the entire length Ws of the sipe 7. When the length Wr of the non-through lug groove 6 is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length of the chamfered portion 8 is 3 mm or more and 36 mm or less, and the length Wr of the non-through lug groove 6 is 1 mm or more and 20 mm or less.

The length Wm is 20% or more of the entire length Ws of the sipe 7 in the tire width direction. When the length Wm is 20% or more of the entire length Ws, block rigidity can be maintained to improve wear resistance performance as well as dry braking performance and wet braking performance.

Figure 12:
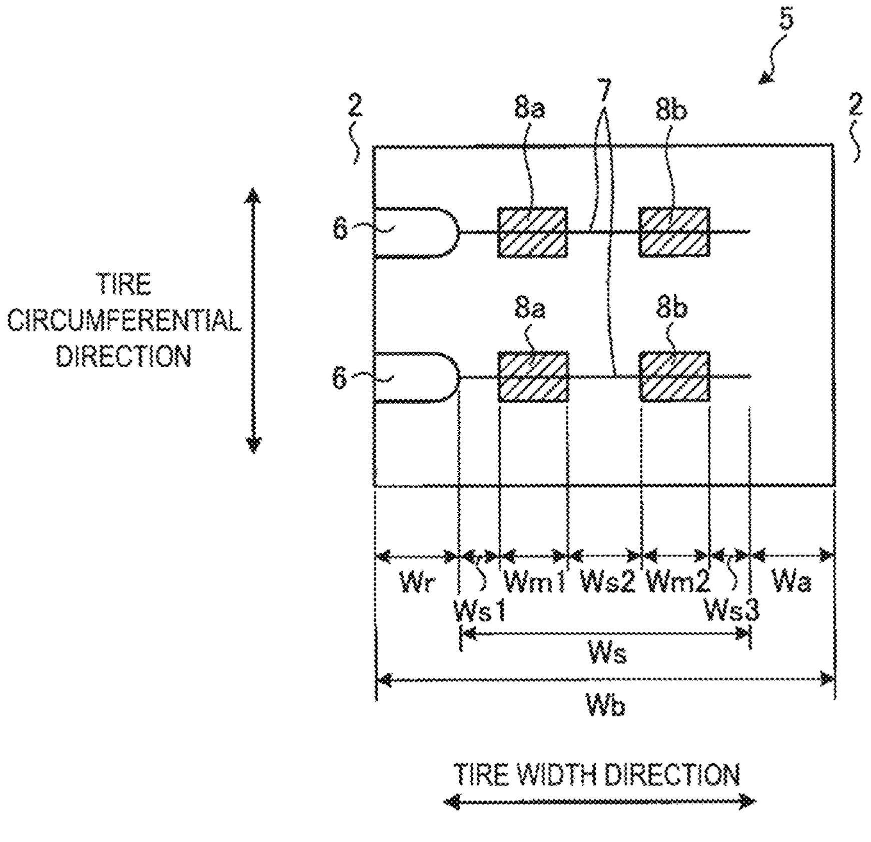
FIG. 12 is an enlarged view illustrating a ninth example of the block illustrated in FIG. 2.

FIG. 12 is an enlarged view illustrating a ninth example of the block illustrated in FIG. 2. FIG. 12 is a plan view of one block 5 located in the center land portion 3C. In FIG. 12, the sipe 7 in the present example is provided with two chamfered portions 8*a*, 8*b*, and one non-through lug groove 6 is provided in the block 5. The sipe 7, the chamfered portions 8*a*, the chamfered portions 8*b*, and the non-through lug groove 6 are disposed in a row. The chamfered portion 8 is connected to the non-through lug groove 6. The non-through lug groove 6 is provided at an end (i.e., edge portion) of the block 5 in the tire width direction. The non-through lug groove 6 is connected to the circumferential main groove 2. One end of the sipe 7 is connected to the non-through lug groove 6. The other end of the sipe 7 is not connected to the circumferential main groove 2 or the lug groove, and terminates in the block 5, that is, in the land portion. The portions having the length Ws1, the length Ws2, and the length Ws3 in the tire width direction in the entire length Ws of the sipe 7 are provided with no chamfered portions 8*a*, 8*b*. The entire length Ws of the sipe 7 is the total length of the length Ws1, the length Ws2, the length Ws3, and the length Wm1 and the length Wm2 of the chamfered portions 8*a*, 8*b* in the tire width direction.

The total length Wm of the length Wm1 and the length Wm2 of the chamfered portions 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm1 and the length Wm2 of the chamfered portions 8 in the tire width direction is a portion where only the sipe is provided. No sipe is provided in a portion having a length Wa extending from a termination position of the sipe 7 to the main groove 2 where no non-through lug groove 6 is provided.

Here, it is given that a length of the non-through lug groove 6 in the tire width direction is Wr, and a length of the non-through lug groove 6 in the tire width direction is Wr. The length Wr is preferably 10% or more and 30% or less of the entire length Ws of the sipe 7. When the length Wr of the non-through lug groove 6 is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a*, the length Wm2 of the chamfered portion 8*b*, and the length Wm3 of the chamfered portion 8*c* each are 3 mm or more and 36 mm or less, and the length Wr1 of the non-through lug groove 6*a* and the length Wr2 of the non-through lug groove 6*b* each are 1 mm or more and 20 mm or less.

The total length Wm of the lengths Wm1 and Wm2 is 20% or more of the entire length Ws of the sipe 7 in the tire width direction. When the total length of the lengths Wm1 and Wm2 is 20% or more of the length Ws, block rigidity can be maintained to improve wear resistance performance as well as dry braking performance and wet braking performance.

Figure 13:
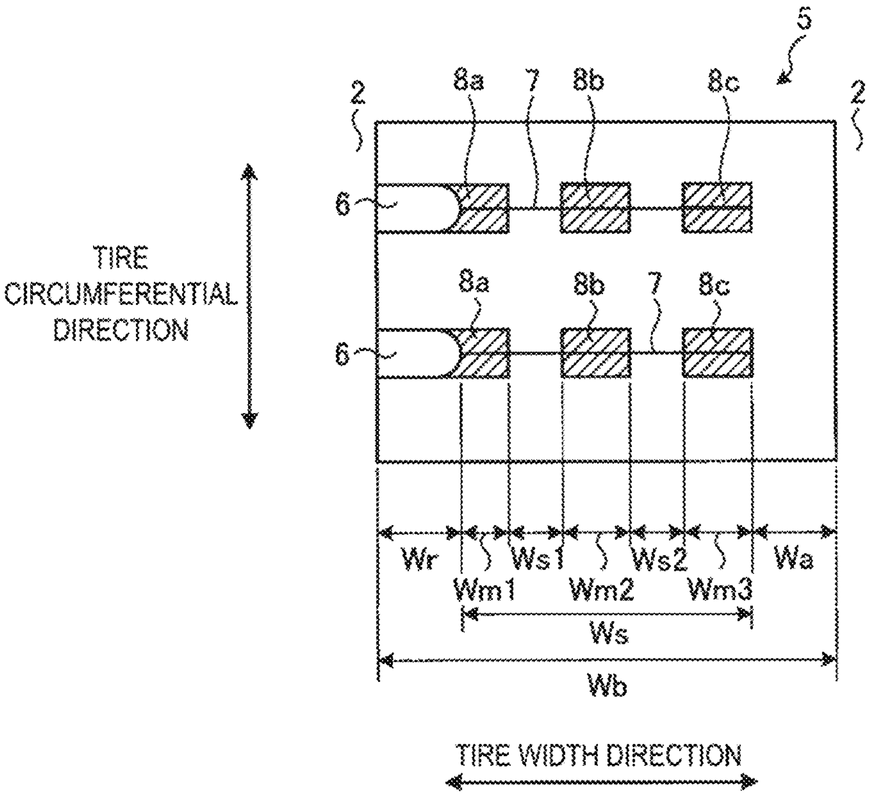
FIG. 13 is an enlarged view illustrating a tenth example of the block illustrated in FIG. 2.

FIG. 13 is an enlarged view illustrating a tenth example of the block illustrated in FIG. 2. FIG. 13 is a plan view of one block 5 located in the center land portion 3C. In FIG. 13, the sipe 7 in the present example is provided with three chamfered portions 8*a*, 8*b*, 8*c*, and one non-through lug groove 6 is provided in the block 5. The sipe 7, the chamfered portion 8*a*, the chamfered portion 8*b*, the chamfered portion 8*c*, and the non-through lug groove 6 are disposed in a row. The chamfered portion 8*a* is connected to the non-through lug groove 6. The chamfered portions 8*b* and 8*c* are not connected to the non-through lug groove 6. The non-through lug groove 6 is provided at an end (i.e., edge portion) of the block 5 in the tire width direction. The non-through lug groove 6 is connected to the circumferential main groove 2. One end of the sipe 7 is connected to the non-through lug groove 6. The other end of the sipe 7 is not connected to the circumferential main groove 2 or the lug groove, and terminates in the block 5, that is, in the land portion. The portions having the length Ws1 and the length Ws2 in the tire width direction in the entire length Ws of the sipe 7 are provided with no chamfered portion. The entire length Ws of the sipe 7 is the total length of the length Ws1, the length Ws2, and the lengths Wm1, Wm2, and Wm3 of the chamfered portions 8*a*, 8*b*, 8*c* in the tire width direction.

The total length Wm of the length Wm1, the length Wm2, and the length Wm3 of the chamfered portions 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm1, the length Wm2, and the length Wm3 of the chamfered portions 8 in the tire width direction is a portion where only the sipe is provided. No sipe is provided in a portion having a length Wa extending from a termination position of the sipe 7 to the main groove 2 where no non-through lug groove 6 is provided.

Here, a length of the non-through lug grooves 6 in the tire width direction is defined as Wr. The length Wr is preferably 10% or more and 30% or less of the entire length Ws of the sipe 7. When the length Wr of the non-through lug groove 6 is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a*, the length Wm2 of the chamfered portion 8*b*, and the length Wm3 of the chamfered portion 8*c* each are 3 mm or more and 36 mm or less, and the length Wr1 of the non-through lug groove 6*a* and the length Wr2 of the non-through lug groove 6*b* each are 1 mm or more and 20 mm or less.

The total length Wm of the lengths Wm1, Wm2, and Wm3 is 20% or more of the entire length Ws of the sipe 7 in the tire width direction. When the total length Wm of the lengths Wm1, Wm2, and Wm3 is 20% or more of the entire length Ws, block rigidity can be maintained to improve wear resistance performance as well as dry braking performance and wet braking performance.

Figure 14:
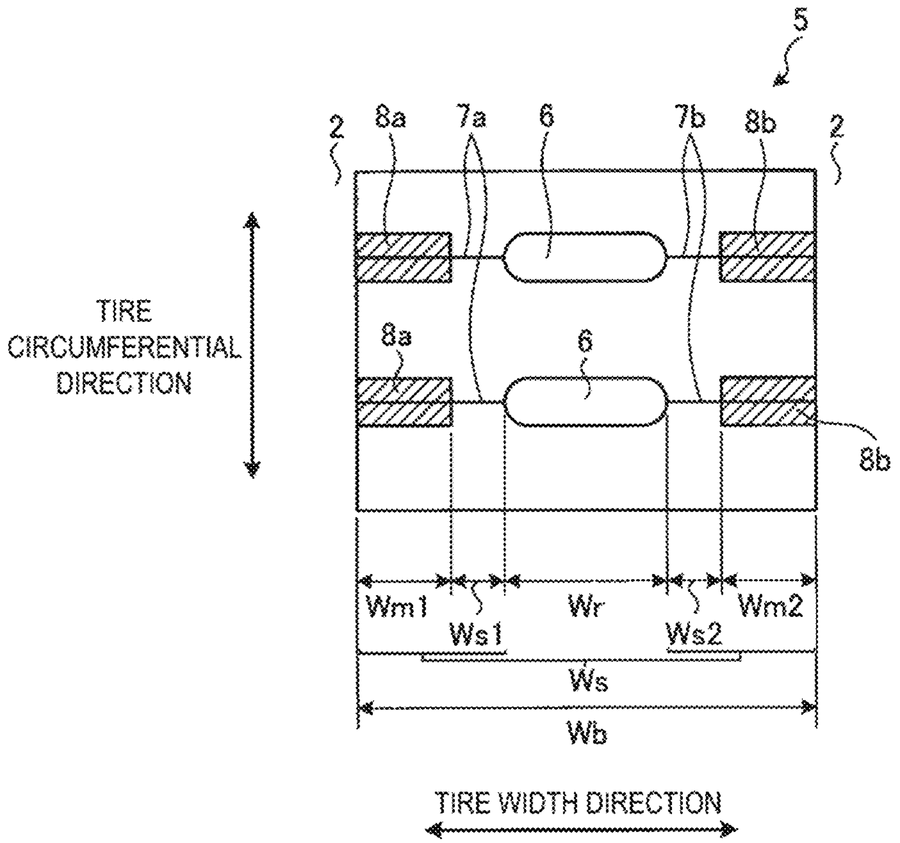
FIG. 14 is an enlarged view illustrating an eleventh example of the block illustrated in FIG. 2.

FIG. 14 is an enlarged view illustrating an eleventh example of the block illustrated in FIG. 2. FIG. 14 is a plan view of one block 5 located in the center land portion 3C. In FIG. 14, the block 5 of the present example includes two sipes 7*a* and 7*b*. The sipe 7*a*, the sipe 7*b*, the chamfered portion 8*a*, the chamfered portion 8*b*, and the non-through lug groove 6 are disposed in a row. The sipe 7*a* is provided with one chamfered portion 8*a*, and the sipe 7*b* is provided with one chamfered portion 8*b*. One non-through lug groove 6 is provided between the sipe 7*a* and the sipe 7*b*. The chamfered portions 8*a*, 8*b* are connected to different circumferential main grooves 2. The chamfered portions 8*a*, 8*b* are not connected to the non-through lug groove 6. The non-through lug groove 6 is provided at a portion other than an end (i.e., portion other than an edge portion) of the block 5 in the tire width direction. The non-through lug groove 6 is not connected to the circumferential main groove 2. One end of the sipe 7*a* is connected to the non-through lug groove 6, and the other end of the sipe 7*a* is connected to the circumferential main groove 2. One end of the sipe 7*b* is connected to the non-through lug groove 6, and the other end of the sipe 7*b* is connected to the circumferential main groove 2. Both ends of the non-through lug groove 6 are not connected to the circumferential main groove 2. The portions having the length Ws1 and the length Ws2 in the tire width direction in the entire length Ws, which is the total length of the lengths of the sipes 7*a* and 7*b*, are provided with no chamfered portions 8*a*, 8*b*. The entire length Ws of the sipes 7*a* and 7*b* is the total length of the length Ws1, the length Ws2, and the lengths Wm1, Wm2 of the chamfered portions 8*a*, 8*b* in the tire width direction.

The total length Wm of the length Wm1 and the length Wm2 of the chamfered portions 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm1, the length Wm2, and the length Wm3 of the chamfered portions 8 in the tire width direction is a portion where only the sipe is provided.

Here, it is given that a length of the non-through lug groove 6 in the tire width direction is Wr, and a length of the non-through lug groove 6 in the tire width direction is Wr. The length Wr is preferably 10% or more and 30% or less of the entire length Ws of the sipe 7. When the length Wr of the non-through lug groove 6 is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm1 of the chamfered portion 8*a* and the length Wm2 of the chamfered portion 8*b* each are 3 mm or more and 36 mm or less, and the length Wr1 of the non-through lug groove 6*a* and the length Wr2 of the non-through lug groove 6*b* each are 1 mm or more and 20 mm or less.

The total length Wm of the lengths Wm1 and Wm2 is 20% or more of the entire length Ws of the sipe 7 in the tire width direction. When the total length of the lengths Wm1 and Wm2 is 20% or more of the length Ws, block rigidity can be maintained to improve wear resistance performance as well as dry braking performance and wet braking performance.

Figure 15:
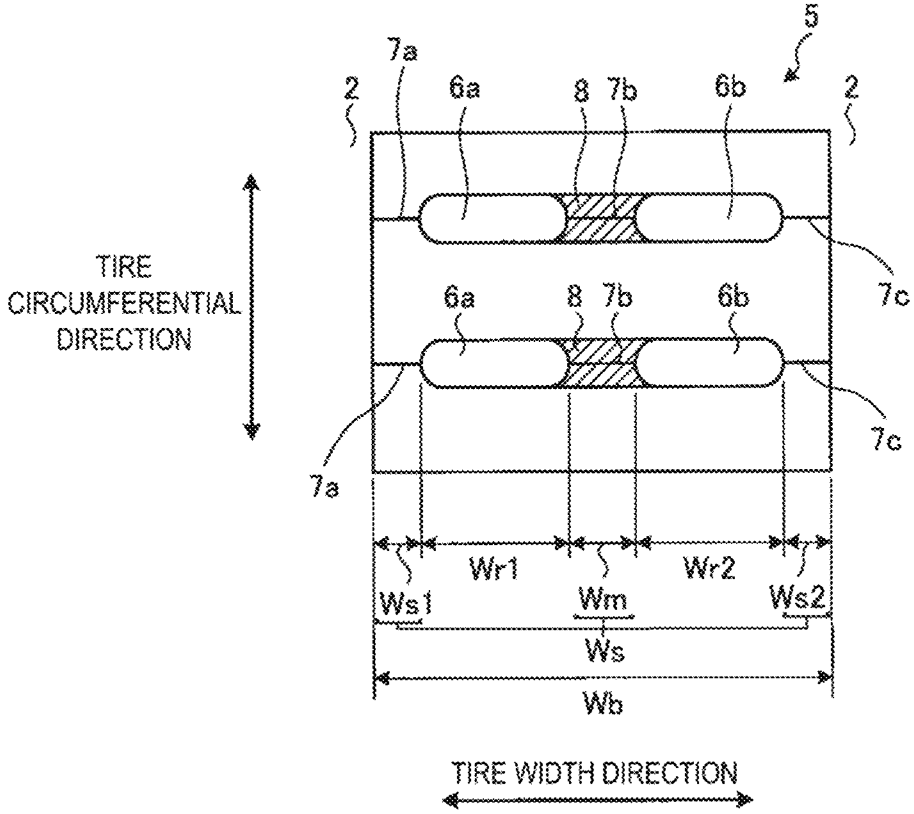
FIG. 15 is an enlarged view illustrating a twelfth example of the block illustrated in FIG. 2.

FIG. 15 is an enlarged view illustrating a twelfth example of the block illustrated in FIG. 2. FIG. 15 is a plan view of one block 5 located in the center land portion 3C. In FIG. 15, the block 5 of the present example includes three sipes 7*a*, 7*b*, and 7*c*. The sipe 7*a*, the sipe 7*b*, the sipe 7*c*, the chamfered portions 8, the non-through lug groove 6*a*, and the non-through lug groove 6*b* are disposed in a row. The sipe 7*b* is provided with one chamfered portion 8. The lug groove 6*a* and the non-through lug groove 6*b* are provided at ends of the chamfered portion 8 in the tire width direction. The non-through lug groove 6*a* and the non-through lug groove 6*b* are provided at portions other than ends (i.e., portions other than edge portions) of the block 5 in the tire width direction. The non-through lug groove 6*a* and the non-through lug groove 6*b* are not connected to the circumferential main groove 2. The chamfered portion 8 is connected to the non-through lug groove 6*a* and the non-through lug groove 6*b*. One end of the sipe 7*a* is connected to the non-through lug groove 6, and the other end of the sipe 7*a* is connected to the circumferential main groove 2. One end of the sipe 7*c* is connected to the non-through lug groove 6, and the other end of the sipe 7*c* is connected to the circumferential main groove 2. The non-through lug groove 6*a* and the non-through lug groove 6*b* are not connected to the circumferential main groove 2. The portions having the length Ws1 and the length Ws2 in the tire width direction in the entire length Ws, which is the total length of the sipes 7*a*, 7*b*, and 7*c*, are provided with no chamfered portions 8. The entire length Ws of the sipe 7*a*, the sipe 7*b*, and the sipe 7*c* is the total length of the length Ws1 and the length Ws2 and the length Wm of the chamfered portion 8 in the tire width direction.

The length Wm of the chamfered portion 8 in the tire width direction is less than 70% of the entire length Ws of the sipe 7. When the length Wm is less than 70% of the entire length Ws, block rigidity can be maintained to improve wear resistance performance as well as dry braking performance and wet braking performance. Note that, a portion of the entire length Ws of the sipe 7 in the tire width direction excluding the length Wm of the chamfered portion 8 in the tire width direction is a portion where only the sipe is provided.

Here, a total length of the length Wr1 of the non-through lug groove 6*a* in the tire width direction and the length Wr1 of the non-through lug groove 6*b* in the tire width direction is defined as Wr. The length Wr is preferably 10% or more and 30% or less of the entire length Ws of the sipe 7. When the total length Wr of the non-through lug groove 6*a* and the non-through lug groove 6*b* is 10% or more and 30% or less of the entire length Ws of the sipe 7, the block rigidity can be maintained to improve wear resistance performance as well as dry braking performance and wet braking performance.

For example, the entire length Ws of the sipe 7 in the tire width direction is 1 mm or more and 20 mm or less, the length Wm of the chamfered portion 8 is 3 mm or more and 36 mm or more, and the length Wr1 of the non-through lug groove 6*a* and the length Wr2 of the non-through lug groove 6*b* each are 1 mm or more and 20 mm or less.

The length Wm is 20% or more of the entire length Ws of the sipe 7 in the tire width direction. When the length Wm is 20% or more of the entire length Ws, block rigidity can be maintained to improve wear resistance performance as well as dry braking performance and wet braking performance.

Figure 16:
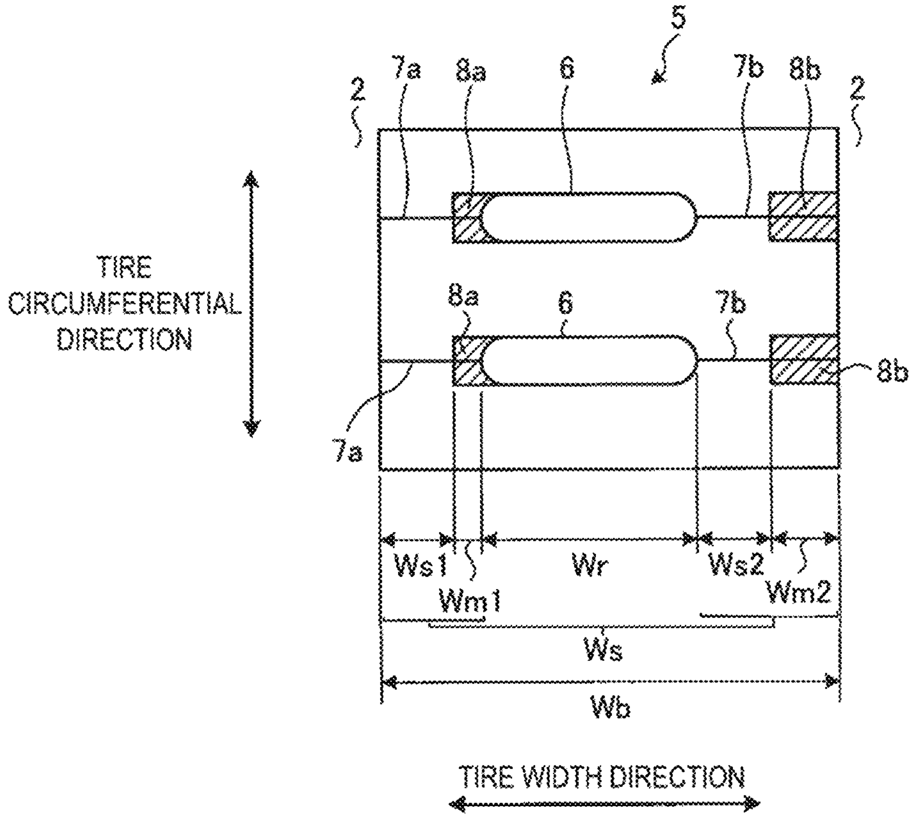
FIG. 16 is an enlarged view illustrating a thirteenth example of the block illustrated in FIG. 2.

FIG. 16 is an enlarged view illustrating a thirteenth example of the block illustrated in FIG. 2. FIG. 16 is a plan view of one block 5 located in the center land portion 3C. In FIG. 16, the block 5 of the present example includes two sipes 7*a* and 7*b*. The sipe 7*a*, the sipe 7*b*, the chamfered portion 8*a*, the chamfered portion 8*b*, and the non-through lug groove 6 are disposed in a row. The sipe 7*a* is provided with one chamfered portion 8*a*. The sipe 7*b* is provided with one chamfered portion 8*b*. The non-through lug groove 6 is provided at an end of the chamfered portion 8*a* in the tire width direction. The non-through lug groove 6 is provided at a portion other than an end (i.e., portion other than an edge portion) of the block 5 in the tire width direction. The non-through lug groove 6 is not connected to the circumferential main groove 2. The chamfered portion 8*a* is connected to the non-through lug groove 6. The chamfered portion 8*b* is not connected to the non-through lug groove 6. One end of the sipe 7*a* is connected to the non-through lug groove 6, and the other end of the sipe 7*a* is connected to the circumferential main groove 2. One end of the sipe 7*b* is connected to the non-through lug groove 6, and the other end of the sipe 7*b* is connected to the circumferential main groove 2. The non-through lug groove 6 is not connected to the circumferential main groove 2. The portions having the length Ws1 and the length Ws2 in the tire width direction in the entire length Ws, which is the total length of the sipes 7*a* and 7*b*, are provided with no chamfered portions 8*a*, 8*b*. The entire length Ws of the sipe 7*a* and the sipe 7*b* is the total length of the length Ws1 and the length Ws2, and the length Wm1 of the chamfered portion 8*a* in the tire width direction and the length Wm2 of the chamfered portion 8*b* in the tire width direction.

The total length Wm of the length Wm1 of the chamfered portion 8*a* in the tire width direction and the length Wm2 of the chamfered portion 8*b* in the tire width direction is less than 70% of the entire length Ws. When the length Wm is less than 70% of the entire length Ws, block rigidity can be maintained to improve wear resistance performance as well as dry braking performance and wet braking performance. Note that, a portion of the entire length Ws of the sipes 7*a* and 7*b* in the tire width direction excluding the length Wm1 of the chamfered portion 8*a* and the length Wm2 of the chamfered portion 8*b* in the tire width direction is a portion where only the sipe is provided.

Here, a length of the non-through lug grooves 6 in the tire width direction is defined as Wr. The length Wr is preferably 10% or more and 30% or less of the entire length Ws of the sipe 7*a* and the sipe 7*b*. When the length Wr of the non-through lug groove 6 is 10% or more and 30% or less of the entire length Ws, the block rigidity can be maintained to improve wear resistance performance as well as dry braking performance and wet braking performance.

For example, the entire length Ws of the sipe 7*a* and the sipe 7*b* is 1 mm or more and 20 mm or less, the lengths Wm1, Wm2 of the chamfered portions 8*a*, 8*b* each are 3 mm or more and 36 mm or less, and the length Wr of the non-through lug groove 6 is 1 mm or more and 20 mm or less.

The length Wm is 20% or more of the entire length Ws. When the length Wm is 20% or more of the entire length Ws, block rigidity can be maintained to improve wear resistance performance as well as dry braking performance and wet braking performance.

Figure 17:
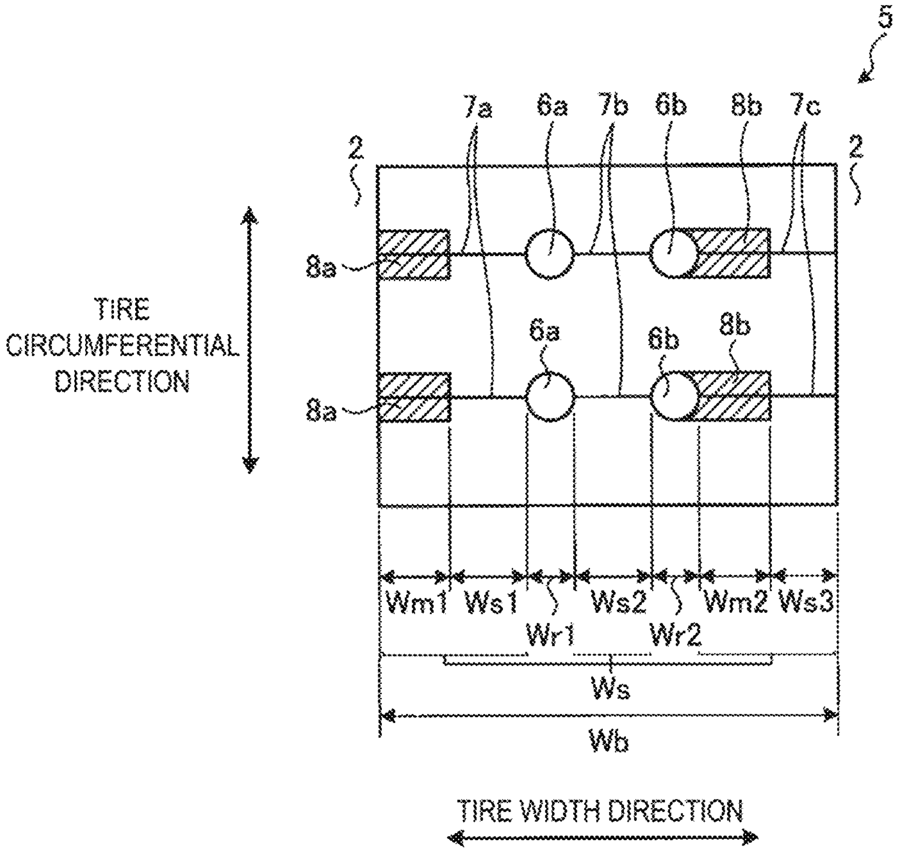
FIG. 17 is an enlarged view illustrating a fourteenth example of the block illustrated in FIG. 2.

FIG. 17 is an enlarged view illustrating a fourteenth example of the block illustrated in FIG. 2. FIG. 17 is a plan view of one block 5 located in the center land portion 3C. In FIG. 17, the block 5 of the present example includes three sipes 7*a*, 7*b*, and 7*c*. The sipe 7*a*, the sipe 7*b*, the sipe 7*c*, the chamfered portion 8*a*, the chamfered portion 8*b*, and the non-through lug groove 6 are disposed in a row. The sipe 7*a* is provided with one chamfered portion 8*a*. The sipe 7*b* is provided with no chamfered portion. The sipe 7*c* is provided with one chamfered portion 8*b*. An end of the chamfered portion 8*a* in the tire width direction is connected to the circumferential main groove 2. The chamfered portion 8*a* is not connected to the non-through lug groove 6*a*. The chamfered portion 8*b* is connected to the non-through lug groove 6*b*. The chamfered portion 8*b* is not connected to the circumferential main groove 2. One end of the sipe 7*a* is connected to the non-through lug groove 6*a*, and the other end of the sipe 7*a* is connected to the circumferential main groove 2. One end of the sipe 7*b* is connected to the non-through lug groove 6*a*, and the other end of the sipe 7*b* is connected to the non-through lug groove 6*b*. The non-through lug groove 6*a* and the non-through lug groove 6*b* are provided at portions other than ends (i.e., portions other than edge portions) of the block 5 in the tire width direction. The non-through lug groove 6*a* and the non-through lug groove 6*b* are not connected to the circumferential main groove 2. One end of the sipe 7*c* is connected to the non-through lug groove 6*b*, and the other end of the sipe 7*c* is connected to the circumferential main groove 2. The non-through lug grooves 6*a*, 6*b* are not connected to the circumferential main groove 2. The portions having the length Ws1, the length Ws2, and the length Ws3 in the tire width direction in the entire length Ws, which is the total length of the sipes 7*a*, 7*b*, and 7*c*, are provided with no chamfered portions 8*a*, 8*b*. The entire length Ws of the sipe 7*a*, the sipe 7*b*, and the sipe 7*c* is the total length of the length Ws1, the length Ws2, the length Ws3, the length Wm1 of the chamfered portion 8*a* in the tire width direction, and the length Wm2 of the chamfered portion 8*b* in the tire width direction.

The total length Wm of the length Wm1 of the chamfered portion 8*a* in the tire width direction and the length Wm2 of the chamfered portion 8*b* in the tire width direction is less than 70% of the entire length Ws. When the length Wm is less than 70% of the entire length Ws, block rigidity can be maintained to improve wear resistance performance as well as dry braking performance and wet braking performance. Note that, a portion of the entire length Ws of the sipes 7*a* and 7*b* in the tire width direction excluding the length Wm1 of the chamfered portion 8*a* and the length Wm2 of the chamfered portion 8*b* in the tire width direction is a portion where only the sipe is provided.

Here, a total length of the length Wr1 of the non-through lug groove 6*a* in the tire width direction and the length Wr1 of the non-through lug groove 6*b* in the tire width direction is defined as Wr. The length Wr is preferably 10% or more and 30% or less of the entire length Ws of the sipe 7*a*, 7*b*, and 7*c*. When the length Wr of the non-through lug groove 6 is 10% or more and 30% or less of the entire length Ws, the block rigidity can be maintained to improve wear resistance performance as well as dry braking performance and wet braking performance.

For example, the entire length Ws of the sipes 7*a*, 7*b*, and 7*c* is 1 mm or more and 20 mm or less, the lengths Wm1, Wm2 of the chamfered portions 8*a*, 8*b* are 3 mm or more and 36 mm or less, and the length Wr1 of the non-through lug groove 6*a* and the length Wr2 of the non-through lug groove 6*b* each are 1 mm or more and 20 mm or less.

The total length Wm of the lengths Wm1 and Wm2 is 20% or more of the entire length Ws. When the length Wm is 20% or more of the entire length Ws, block rigidity can be maintained to improve wear resistance performance as well as dry braking performance and wet braking performance.

Figure 18:
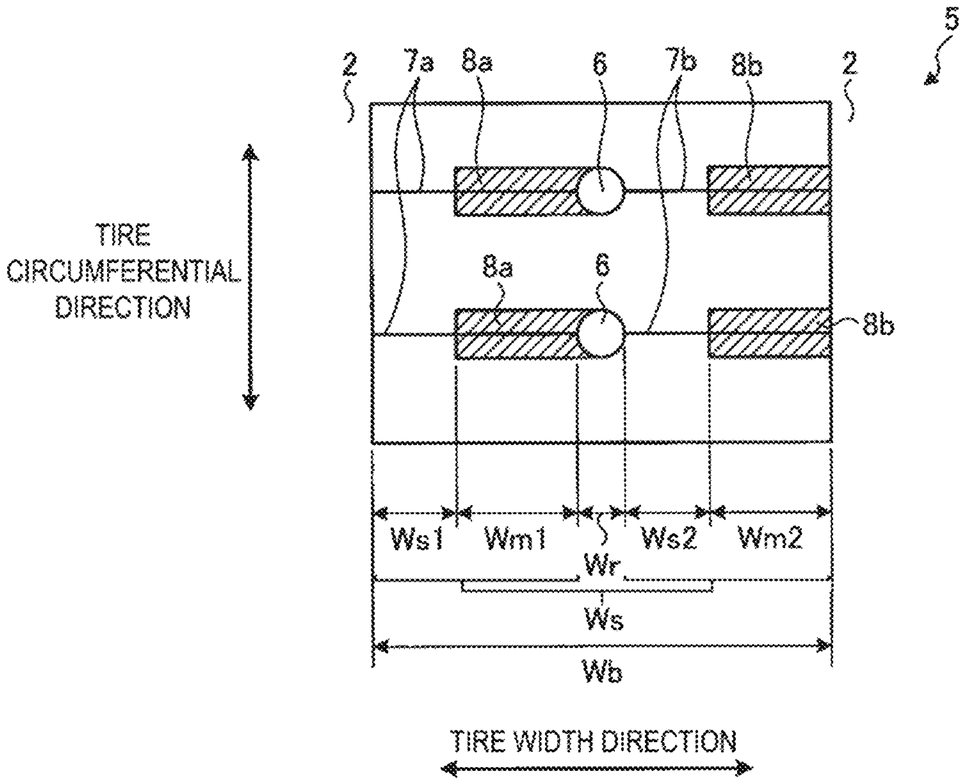
FIG. 18 is an enlarged view illustrating a fifteenth example of the block illustrated in FIG. 2.

FIG. 18 is an enlarged view illustrating a fifteenth example of the block illustrated in FIG. 2. FIG. 18 is a plan view of one block 5 located in the center land portion 3C. In FIG. 18, the block 5 of the present example includes two sipes 7*a* and 7*b*. The sipe 7*a*, the sipe 7*b*, the chamfered portion 8*a*, the chamfered portion 8*b*, and the non-through lug groove 6 are disposed in a row. The sipe 7*a* is provided with one chamfered portion 8*a*. The sipe 7*b* is provided with one chamfered portion 8*b*. The chamfered portion 8*a* is not connected to the circumferential main groove 2. The chamfered portion 8*a* is connected to the non-through lug groove 6. An end of the chamfered portion 8*b* in the tire width direction is connected to the circumferential main groove 2. The chamfered portion 8*b* is not connected to the non-through lug groove 6. The non-through lug groove 6 is provided at a portion other than an end (i.e., portion other than an edge portion) of the block 5 in the tire width direction. The non-through lug groove 6 is not connected to the circumferential main groove 2. One end of the sipe 7*a* is connected to the non-through lug groove 6, and the other end of the sipe 7*a* is connected to the circumferential main groove 2. One end of the sipe 7*b* is connected to the non-through lug groove 6, and the other end of the sipe 7*b* is connected to the circumferential main groove 2. The non-through lug groove 6 is not connected to the circumferential main groove 2. The portions having the length Ws1 and the length Ws2 in the tire width direction in the entire length Ws, which is the total length of the sipes 7*a* and 7*b*, are provided with no chamfered portions 8*a*, 8*b*. The entire length Ws of the sipe 7*a* and the sipe 7*b* is the total length of the length Ws1 and the length Ws2, and the length Wm1 of the chamfered portion 8*a* in the tire width direction and the length Wm2 of the chamfered portion 8*b* in the tire width direction.

The total length Wm of the length Wm1 of the chamfered portion 8*a* in the tire width direction and the length Wm2 of the chamfered portion 8*b* in the tire width direction is less than 70% of the entire length Ws. When the length Wm is less than 70% of the entire length Ws, block rigidity can be maintained to improve wear resistance performance as well as dry braking performance and wet braking performance. Note that, a portion of the entire length Ws of the sipes 7*a* and 7*b* in the tire width direction excluding the length Wm1 of the chamfered portion 8*a* and the length Wm2 of the chamfered portion 8*b* in the tire width direction is a portion where only the sipe is provided.

Here, a length of the non-through lug grooves 6 in the tire width direction is defined as Wr. The length Wr is preferably 10% or more and 30% or less of the entire length Ws of the sipe 7*a* and 7*b*. When the length Wr of the non-through lug groove 6 is 10% or more and 30% or less of the entire length Ws, the block rigidity can be maintained to improve wear resistance performance as well as dry braking performance and wet braking performance.

For example, the entire length Ws of the sipe 7*a* and 7*b* is 1 mm or more and 20 mm or less, the lengths Wm1, Wm2 of the chamfered portions 8*a*, 8*b* are 3 mm or more and 36 mm or less, and the length Wr of the non-through lug groove 6 is 1 mm or more and 20 mm or less.

The total length Wm of the lengths Wm1 and Wm2 is 20% or more of the entire length Ws. When the length Wm is 20% or more of the entire length Ws, block rigidity can be maintained to improve wear resistance performance as well as dry braking performance and wet braking performance.

Figure 19:
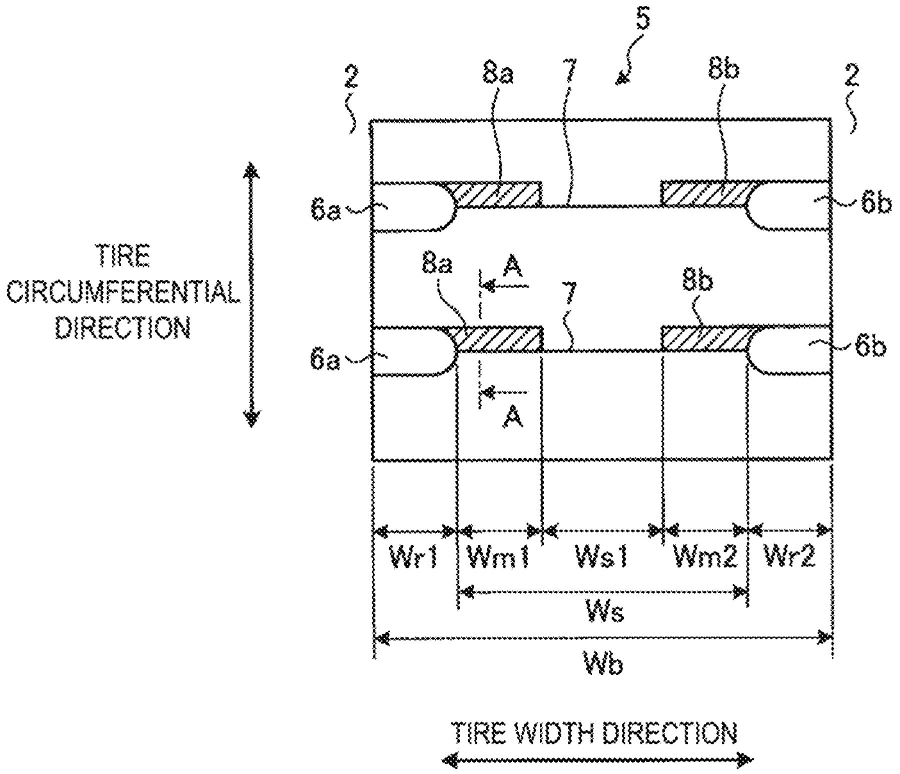
FIG. 19 is an enlarged view illustrating a sixteenth example of the block illustrated in FIG. 2.

FIG. 19 is an enlarged view illustrating a sixteenth example of the block illustrated in FIG. 2. FIG. 19 is a plan view of one block 5 located in the center land portion 3C. In FIG. 19, as in FIG. 3, the sipe 7 in the present example is provided with two chamfered portions 8*a*, 8*b*, and two non-through lug grooves 6*a*, 6*b* are provided in the block 5. In the present example, in contrast to that in FIG. 3, the chamfered portions 8*a*, 8*b* are provided only on one groove wall surface of the sipe 7. The chamfered portions 8*a* and 8*b* are not provided on the other groove wall surface of the sipe 7. In other words, the chamfered portions 8*a* and 8*b* are provided only on one of groove wall surfaces on both sides of the sipe 7. Also in the present example, as in FIG. 3, the total length Wm of the lengths Wm1, Wm2 of the chamfered portions 8*a*, 8*b* provided in the sipe 7 in the tire width direction is less than 70% of the entire length Ws of the sipe 7 in the tire width direction. The length of the chamfered portions 8 in the tire width direction is 20% or more of the length of the sipe 7 in the tire width direction.

Figure 20:
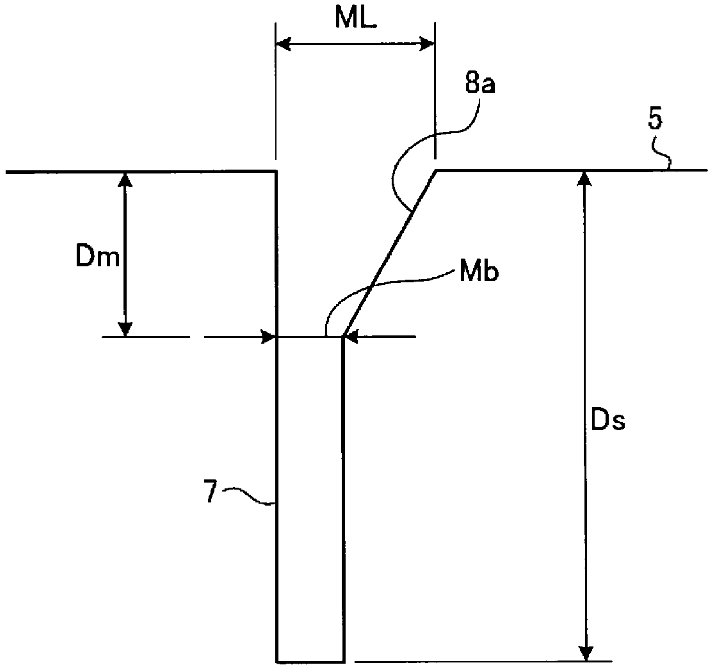
FIG. 20 is a cross-sectional view along line A-A in FIG. 19.

FIG. 20 is a cross-sectional view along line A-A in FIG. 19. In FIG. 20, it is given that a depth of the sipe 7 is Ds, a depth (depth of the deepest portion) of the chamfered portions 8 (chamfered portions 8*a*, 8*b*) is Dm, and a groove depth of the circumferential main groove is D. Further, the depth of the lug grooves is defined as Dr. In this case, the relationship between the depths is D>Dr≥Ds>Dm. With such a relationship in depth, block rigidity can be maintained to improve wear resistance performance as well as dry braking performance and wet braking performance.

Figure 21:
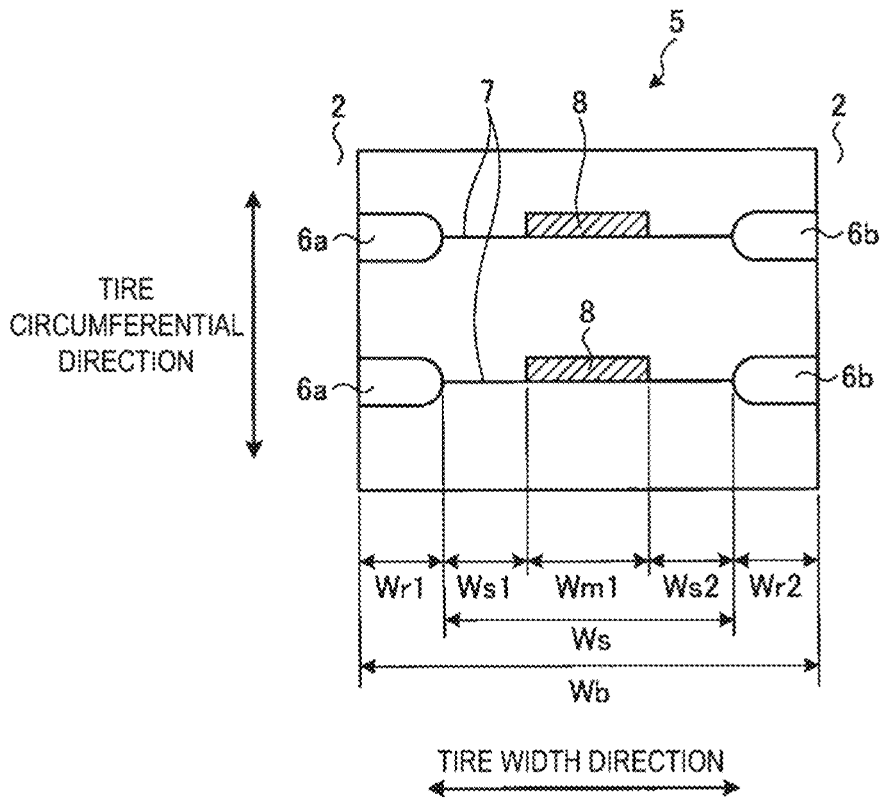
FIG. 21 is an enlarged view illustrating a seventeenth example of the block illustrated in FIG. 2.

FIG. 21 is an enlarged view illustrating a seventeenth example of the block illustrated in FIG. 2. FIG. 21 is a plan view of one block 5 located in the center land portion 3C. In FIG. 21, as in FIG. 4, the sipe 7 in the present example is provided with one chamfered portion 8, and two non-through lug grooves 6*a*, 6*b* are provided in the block 5. In the present example, in contrast to that in FIG. 4, the chamfered portion 8 is provided only on one groove wall surface of the sipe 7. The chamfered portion 8 is not provided on the other groove wall surface of the sipe 7. In other words, the chamfered portion 8 is provided only on one of groove wall surfaces on both sides of the sipe 7. Also in the present example, as in FIG. 4, the length Wm1 of the chamfered portion 8 provided in the sipe 7 in the tire width direction is less than 70% of the entire length Ws of the sipe 7 in the tire width direction. The length of the chamfered portions 8 in the tire width direction is 20% or more of the length of the sipe 7 in the tire width direction. In each of the blocks 5 illustrated in FIGS. 6 to 18, the chamfered portion 8 may be provided only on one of groove wall surfaces on both sides of the sipe 7.

As described with reference to FIGS. 19, 20, and 21, by providing the chamfered portion 8 on at least one of the groove wall surfaces of the sipe 7, block rigidity can be maintained to improve wear resistance performance as well as dry braking performance and wet braking performance in the same manner as described with reference to FIGS. 3, 4, and 5.

In FIGS. 3, 5 to 19, and 21, the sipe may be curved or bent (not illustrated). In a case where a plurality of chamfered portions are provided in one sipe, some chamfered portions (not illustrated) may be provided on only one groove wall surface of the sipe 7.

EXAMPLES

Table 1 and Table 2 are tables illustrating results of performance tests of pneumatic tires according to embodiments of the technology.

In the performance tests, for a plurality of types of test tires, wear resistance performance, dry braking performance, and wet braking performance were evaluated. The test tires having a size of 205/55R16 were assembled on wheels having a size of 16×6.5 J, and the tires were inflated to an air pressure of 200 kPa and mounted on a test FF (front-engine, front-wheel-drive) sedan passenger vehicle (total engine displacement of 1600 cc).

Wear resistance performance was evaluated by measuring the distance traveled on the test vehicle on a dry road surface until the tread surface was fully worn, that is, the distance traveled until a wear indicator provided in the circumferential main groove 2 was exposed, and indexing the measured running distance. A larger index value indicates superior wear resistance performance. For dry braking performance, the braking distance was measured on a dry road surface at a speed of 100 km/h. Using the reciprocal of the measurement value, a larger index value indicates superior dry performance. For wet braking performance, the braking distance was measured on a wet road surface with a water depth of 1 mm at a speed of 100 km/h. Using the reciprocal of the measurement value, a larger index value indicates superior wet performance.

The pneumatic tires of Examples 1 to 18 are pneumatic tires provided with a circumferential main groove extending in the tire circumferential direction, a land portion defined by the circumferential main groove, a sipe extending through the land portion in the tire width direction, and a chamfered portion provided in the sipe. A length of the chamfered portion in the tire width direction is less than 70% of a length of the sipe in the tire width direction. Note that in all of the pneumatic tires of Examples 1 to 18, the relationship between the depth Ds of the sipe and the groove depth D of the circumferential main groove is D>Ds. In all of the pneumatic tires of Examples 1 to 18, the relationship between the depth Dr of the lug groove and the groove depth D of the circumferential main groove is D>Dr.

A pneumatic tire of Conventional Example is a pneumatic tire that has a sipe in a tread portion, but that does not have a chamfered portion at the sipe. A pneumatic tire of Comparative Example 1 is a pneumatic tire that has a sipe and a chamfered portion in the tread portion, that does not have a lug groove aligned with the sipe and the chamfered portion, and in which the length of the chamfered portion is 100% of the length of the sipe. A pneumatic tire of Comparative Example 2 is a tire in which a sipe and a lug groove are disposed in a row in the tread portion, but in which no chamfered portion is provided in the sipe.

As illustrated in Table 1 and Table 2, in the case where the length of the lug groove is 10% or more and 30% or less of the entire length Ws of the sipe, when the relationship between the depth Ds of the sipe and the depth Dm of the chamfered portion is Ds>Dm, the relationship between the depth Dr of the lug groove and the depth Ds of the sipe is Dr≥Ds, and the relationship between the width ML of the chamfered portion and the depth Dm of the chamfered portion is ML>Dm, excellent results for wear resistance performance, dry braking performance, and wet braking performance were obtained.

TABLE 1

| | Conventional Example | Conventional Example 1 | Conventional Example 2 |
|---|---|---|---|
| Presence of sipe | Yes | Yes | Yes |
| Presence of chamfered portion of sipe | No | Yes | No |
| Presence of lug groove | No | No | Yes |
| Length of chamfered portion with respect to length of sipe (%) | 0 | 100 | 0 |
| Length of lug groove with respect to length of sipe (%) | — | — | 50 |
| Relationship between sipe depth Ds and chamfered portion depth Dm | — | — | — |
| Relationship between sipe depth Ds and lug groove depth Dr | — | — | Dr = Ds |
| Relationship between chamfered portion width ML and chamfered portion depth Dm | — | — | — |
| Wear resistance performance | 100 | 98 | 96 |
| Dry performance | 100 | 98 | 100 |
| Wet performance | 100 | 104 | 102 |

| | Example 1 | Example 2 | Example 3 | Example 4 |
|---|---|---|---|---|
| Presence of sipe | Yes | Yes | Yes | Yes |
| Presence of chamfered portion of sipe | Yes | Yes | Yes | Yes |
| Presence of lug groove | Yes | Yes | Yes | Yes |
| Length of chamfered portion with respect to length of sipe (%) | 68 | 65 | 65 | 60 |
| Length of lug groove with respect to length of sipe (%) | 20 | 25 | 10 | 30 |
| Relationship between sipe depth Ds and chamfered portion depth Dm | Ds = Dm | Ds > Dm | Ds > Dm | Ds > Dm |
| Relationship between sipe depth Ds and lug groove depth Dr | Dr = Ds | Dr > Ds | Dr > Ds | Dr > Ds |
| Relationship between chamfered portion width ML and chamfered portion depth Dm | ML < Dm | ML > Dm | ML > Dm | ML > Dm |
| Wear resistance performance | 100 | 102 | 104 | 103 |
| Dry performance | 100 | 102 | 104 | 103 |
| Wet performance | 102 | 102 | 101 | 103 |

| | Example 5 | Example 6 | Example 7 | Example 8 |
|---|---|---|---|---|
| Presence of sipe | Yes | Yes | Yes | Yes |
| Presence of chamfered portion of sipe | Yes | Yes | Yes | Yes |
| Presence of lug groove | Yes | Yes | Yes | Yes |
| Length of chamfered portion with respect to length of sipe (%) | 60 | 55 | 55 | 50 |
| Length of lug groove with respect to length of sipe (%) | 10 | 30 | 10 | 30 |
| Relationship between sipe depth Ds and chamfered portion depth Dm | Ds > Dm | Ds > Dm | Ds > Dm | Ds > Dm |
| Relationship between sipe depth Ds and lug groove depth Dr | Dr > Ds | Dr > Ds | Dr > Ds | Dr > Ds |
| Relationship between chamfered portion width ML and chamfered portion depth Dm | ML > Dm | ML > Dm | ML > Dm | ML > Dm |
| Wear resistance performance | 104 | 103 | 104 | 105 |
| Dry performance | 104 | 103 | 104 | 105 |
| Wet performance | 102 | 104 | 103 | 105 |

TABLE 2

| | Example 9 | Example 10 | Example 11 | Example 12 | Example 13 |
|---|---|---|---|---|---|
| Presence of sipe | Yes | Yes | Yes | Yes | Yes |
| Presence of chamfered portion of sipe | Yes | Yes | Yes | Yes | Yes |
| Presence of lug groove | Yes | Yes | Yes | Yes | Yes |
| Length of chamfered portion with respect to length of sipe (%) | 50 | 40 | 40 | 30 | 30 |
| Length of lug groove with respect to length of sipe (%) | 10 | 30 | 10 | 30 | 10 |

TABLE 2-continued

| | | | | | |
|---|---|---|---|---|---|
| Relationship between sipe depth Ds and chamfered portion depth Dm | Ds > Dm | Ds > Dm | Ds > Dm | Ds > Dm | Ds > Dm |
| Relationship between sipe depth Ds and lug groove depth Dr | Dr > Ds | Dr > Ds | Dr > Ds | Dr > Ds | Dr > Ds |
| Relationship between chamfered portion width ML and chamfered portion depth Dm | ML > Dm | ML > Dm | ML > Dm | ML > Dm | ML > Dm |
| Wear resistance performance | 106 | 107 | 108 | 109 | 110 |
| Dry performance | 106 | 107 | 108 | 109 | 110 |
| Wet performance | 104 | 107 | 106 | 110 | 109 |

| | Example 14 | Example 15 | Example 16 | Example 17 | Example 18 |
|---|---|---|---|---|---|
| Presence of sipe | Yes | Yes | Yes | Yes | Yes |
| Presence of chamfered portion of sipe | Yes | Yes | Yes | Yes | Yes |
| Presence of lug groove | Yes | Yes | Yes | Yes | Yes |
| Length of chamfered portion with respect to length of sipe (%) | 25 | 25 | 20 | 20 | 20 |
| Length of lug groove with respect to length of sipe (%) | 30 | 10 | 30 | 10 | 30 |
| Relationship between sipe depth Ds and chamfered portion depth Dm | Ds > Dm | Ds > Dm | Ds > Dm | Ds > Dm | Ds > Dm |
| Relationship between sipe depth Ds and lug groove depth Dr | Dr > Ds | Dr > Ds | Dr = Ds | Dr = Ds | Dr > Ds |
| Relationship between chamfered portion width ML and chamfered portion depth Dm | ML > Dm | ML > Dm | ML > Dm | ML > Dm | ML > Dm |
| Wear resistance performance | 109 | 110 | 109 | 110 | 109 |
| Dry performance | 109 | 110 | 109 | 110 | 109 |
| Wet performance | 111 | 110 | 112 | 111 | 110 |

The invention claimed is:

1. A pneumatic tire, comprising:

a plurality of circumferential main grooves extending in a tire circumferential direction;

a plurality of through lug grooves extending in a tire width direction;

a land portion defined by the circumferential main grooves and the through lug grooves, the land portion being provided between one of the circumferential main grooves and another one of the circumferential main grooves;

a non-through lug groove provided in the land portion, the non-through lug groove extending in the tire width direction;

a sipe provided in the land portion, the sipe extending in the tire width direction; and one or more chamfered portions provided in the sipe, the one or more chamfered portions being provided at a portion of the sipe other than at both ends of the sipe, the non-through lug groove, the sipe, and the one or more chamfered portions being disposed in a row, and a total length of all chamfered portions in the sipe, including the one or more chamfered portions, in the tire width direction being less than 68% of a total length of the sipe in the tire width direction.

2. The pneumatic tire according to claim 1, wherein a length of the non-through lug groove in the tire width direction is 10% or more and 30% or less of the total length of the sipe.

3. The pneumatic tire according to claim 1, wherein the one or more chamfered portions are provided on at least one of groove wall surfaces of the sipe.

4. The pneumatic tire according to claim 1, wherein the one or more chamfered portions are provided at a portion of the total length of the sipe, and the sipe has a portion not provided with the one or more chamfered portions.

5. The pneumatic tire according to claim 1, wherein the non-through lug groove is provided at an edge portion of the land portion in the tire width direction, and the non-through lug groove opens to one of the circumferential main grooves.

6. The pneumatic tire according to claim 1, wherein the non-through lug groove is provided at a portion other than an edge portion of the land portion in the tire width direction, and the non-through lug groove terminates in the land portion.

7. The pneumatic tire according to claim 1, wherein one end of the sipe is connected to the lug groove, and an other end of the sipe is connected to one of the circumferential main grooves.

8. The pneumatic tire according to claim 1, wherein one end of the sipe is connected to the non-through lug groove, and an other end of the sipe terminates in the land portion.

9. The pneumatic tire according to claim 1, wherein the non-through lug groove comprises two non-through lug grooves, one end of the sipe being connected to one of the two non-through lug grooves and an other end of the sipe being connected to the an other of the two non-through lug grooves.

10. The pneumatic tire according to claim 1, wherein a groove depth of the circumferential main grooves is D, a depth of the non-through lug groove is Dr, a depth of the sipe is Ds, a depth of the one or more chamfered portions is Dm, and a relationship between depths is $D>Dr\geq Ds>Dm$.

11. The pneumatic tire according to claim 10, wherein a width of the one or more chamfered portions in a direction orthogonal to an extension direction of the sipe in a road contact surface of the land portion is ML, and a relationship between ML and the depth Dm of the one or more chamfered portions is $ML>Dm$.

12. The pneumatic tire according to claim 1, wherein the total length of all chamfered portions in the tire width direction is 20% or more of the total length of the sipe in the tire width direction.

13. The pneumatic tire according to claim 12, wherein a length of the non-through lug groove in the tire width direction is 10% or more and 30% or less of the total length of the sipe.

14. The pneumatic tire according to claim 13, wherein a groove depth of the circumferential main grooves is D, a depth of the non-through lug groove is Dr, a depth of the sipe is Ds, a depth of the one or more chamfered portions is Dm, and a relationship between depths is $D>Dr \geq Ds>Dm$.

15. The pneumatic tire according to claim 14, wherein a width of the one or more chamfered portions in a direction orthogonal to an extension direction of the sipe in a road contact surface of the land portion is ML, and a relationship between ML and the depth Dm of the chamfered portion is $ML>Dm$.

16. The pneumatic tire according to claim 15, wherein the one or more chamfered portions are provided on at least one of groove wall surfaces of the sipe.

17. The pneumatic tire according to claim 16, wherein the one or more chamfered portions are provided at a portion of the total length of the sipe, and the sipe has a portion not provided with the one or more chamfered portions.

18. The pneumatic tire according to claim 17, wherein the non-through lug groove comprises two non-through lug grooves, one end of the sipe being connected to one of the two non-through lug grooves and an other end of the sipe being connected to an other of the two non-through lug grooves.

19. A pneumatic tire, comprising:

a plurality of circumferential main grooves extending in a tire circumferential direction and having a groove width of 3.0 mm or more;

a plurality of through lug grooves extending in a tire width direction;

a land portion defined by the circumferential main grooves and the through lug grooves, the land portion being provided between one of the circumferential main grooves and another one of the circumferential main grooves;

a non-through lug groove provided in the land portion, the non-through lug groove extending in the tire width direction;

a sipe provided in the land portion, the sipe extending in the tire width direction; and a chamfered portion provided in the sipe, the non-through lug groove, the sipe, and the chamfered portion being disposed in a row, a length of the chamfered portion in the tire width direction being 40% or more and less than 70% of an entire length of the sipe in the tire width direction, a portion of the sipe being provided without the chamfered portion, the chamfered portion of the sipe chamfering both sides of the sipe in the tire circumferential direction at a same width direction position of the sipe, and the length of the chamfered portion at each of the both sides of the sipe in the tire width direction being the same.

* * * * *